(12) United States Patent
Wang et al.

(10) Patent No.: US 11,127,547 B1
(45) Date of Patent: Sep. 21, 2021

(54) ELECTROACTIVE POLYMERS FOR AN ELECTRONIC DEVICE

(71) Applicant: Apple Inc., Cupertino, CA (US)

(72) Inventors: Paul X. Wang, Cupertino, CA (US); Alex J. Lehmann, Sunnyvale, CA (US); Qiliang Xu, Livermore, CA (US); David L. Christensen, Los Altos Hills, CA (US); Zheng Gao, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 314 days.

(21) Appl. No.: 15/809,951

(22) Filed: Nov. 10, 2017

Related U.S. Application Data

(60) Provisional application No. 62/424,213, filed on Nov. 18, 2016.

(51) Int. Cl.
  *G06F 3/01* (2006.01)
  *H01H 13/85* (2006.01)
  *G06F 1/16* (2006.01)
  *G06F 3/02* (2006.01)

(52) U.S. Cl.
  CPC ............ *H01H 13/85* (2013.01); *G06F 1/163* (2013.01); *G06F 3/016* (2013.01); *G06F 3/0221* (2013.01); *H01H 2215/052* (2013.01)

(58) Field of Classification Search
  None
  See application file for complete search history.

(56) References Cited

U.S. PATENT DOCUMENTS

| | | | | |
|---|---|---|---|---|
| 9,799,279 | B1* | 10/2017 | Evans, V | G09B 21/004 |
| 2002/0130673 | A1* | 9/2002 | Pelrine | H01L 41/1132 |
| | | | | 324/727 |
| 2005/0030292 | A1* | 2/2005 | Diederiks | G09B 21/003 |
| | | | | 345/173 |
| 2013/0044049 | A1* | 2/2013 | Biggs | G06F 3/016 |
| | | | | 345/156 |
| 2015/0316986 | A1* | 11/2015 | Xue | G06F 3/016 |
| | | | | 345/173 |
| 2016/0014521 | A1* | 1/2016 | Kim | B06B 1/0292 |
| | | | | 381/398 |
| 2016/0049265 | A1* | 2/2016 | Bernstein | G06F 3/016 |
| | | | | 200/341 |
| 2017/0177160 | A1* | 6/2017 | Oh | G06F 3/045 |

\* cited by examiner

*Primary Examiner* — Krishna P Neupane
(74) *Attorney, Agent, or Firm* — Brownstein Hyatt Farber Schreck, LLP

(57) ABSTRACT

Embodiments are directed to deformable haptic structures used within an electronic device. The haptic structures may provide input and output for the electronic device. In one aspect, an embodiment includes a keyboard having a housing and a keycap positioned within an opening of the housing. The keyboard may include a haptic structure coupled with the housing and the keycap. The haptic structure may include a compliant layer and a pair of electrodes separated by the compliant layer. The pair of electrodes may be configured to compress the compliant layer in response to an input signal. The compression of the compliant layer caused by the pair of electrodes may move the keycap relative to the housing.

18 Claims, 20 Drawing Sheets

ELECTROACTIVE POLYMERS FOR AN ELECTRONIC DEVICE

CROSS-REFERENCE T RELATED APPLICATION(S)

This application is a nonprovisional patent application of and claims the benefit of U.S. Provisional Patent Application No. 62/424,213, filed Nov. 18, 2016 and titled "Electroactive Polymers for an Electronic Device," the disclosure of which is hereby incorporated by reference herein in its entirety.

FIELD

The described embodiments relate generally to using various materials for providing input and output for an electronic device. More specifically, the present disclosure is directed to using piezoelectric material or electroactive polymers for receiving input and providing haptic output for an electronic device.

BACKGROUND

In computing systems, a user input device may be employed to receive input from a user. Many traditional user input devices, such as keyboards, have a fixed or static layout, which limits the adaptability of the device. Additionally, traditional input devices may be rigid and substantially detached from a user, thereby limiting the functionality of the input device.

SUMMARY

Embodiments of the present invention are directed to deformable haptic structures used within an electronic device.

In a first aspect, the present disclosure includes an input device. The input device includes a housing. The input device further includes an input surface positioned within an opening of the housing. The input device further includes a haptic structure coupled with the housing and the input surface. The haptic structure includes a compliant layer. The haptic structure further includes first and second electrodes separated by the compliant layer and configured to compress the compliant layer. Compression of the compliant layer is configured to move the input surface relative to the housing.

In a second aspect, the present disclosure includes a keyboard. The keyboard includes an input surface. The keyboard further includes a compliant layer positioned below the input surface. The keyboard further includes a set of electrodes positioned on opposite sides of the compliant layer. The keyboard further includes a power source configured to selectively apply an electrical charge to the set of electrodes. The set of electrodes may be configured to reduce a thickness of the compliant layer in response to the electrical charge. The set of electrodes may be further configured to generate an electrical response in response to input received at the input surface.

In a third aspect, the present disclosure includes a wearable device. The wearable device includes a flexible fabric having a first portion and a second portion positioned adjacent to a user. The wearable device further includes a haptic structure positioned on the flexible fabric and positioned between the first and second portions. The haptic structure includes electrodes enmeshed within a compliant layer. The wearable device further includes a processing unit configured to generate an electrostatic force among the electrodes. The electrodes may be configured to produce haptic effects at the first and second portions by selectively deforming the compliant layer in response to the generated electrostatic force.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like elements, and in which.

Figure 1A:
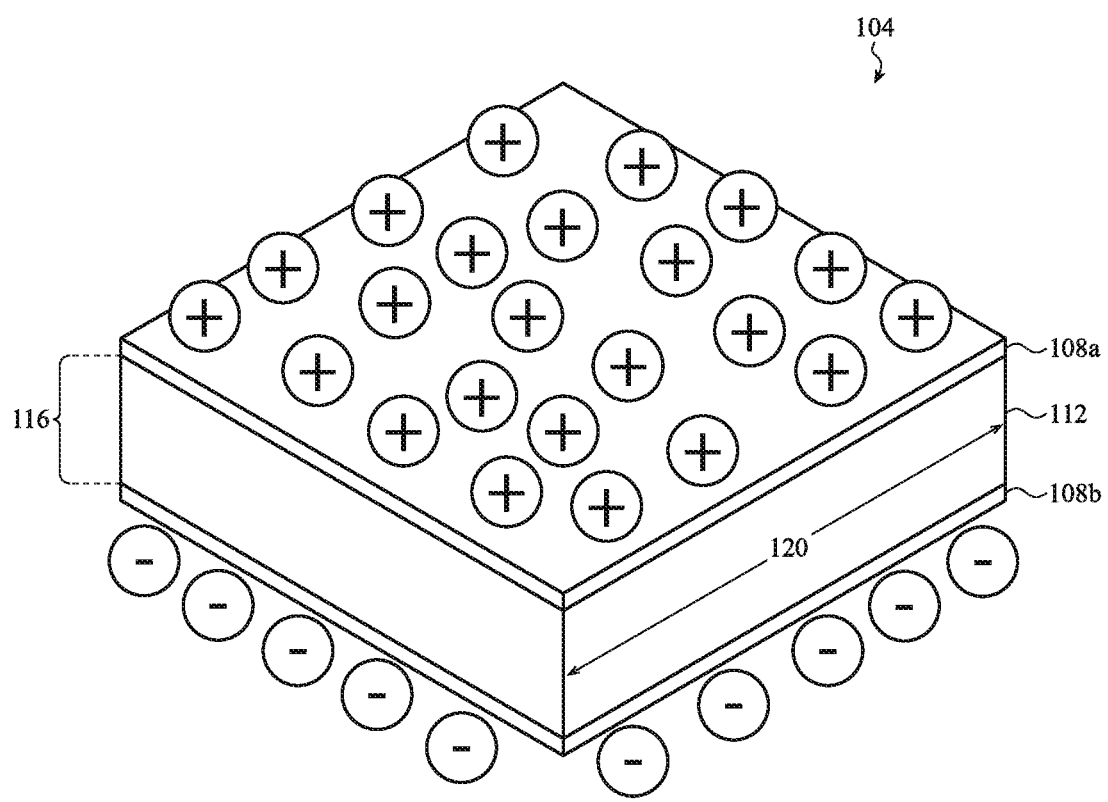
FIG. 1A depicts a sample deformable capacitor.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to haptic structures for an electronic device. A haptic structure may be used with any appropriate electronic device that is configured to receive user input, including, but not limited to, portable computing devices, phones, wearable devices, or the like. The haptic structure may form, or be a component of, an input device of the electronic device, such as a keyboard, trackpad, touch screen, three-dimensional input system (e.g., such as a glove or other wearable input device), or other corresponding input system of the electronic device. The haptic structure may produce a localized tactile effect at the input device and/or alter one or more characteristics (e.g., including a size or a shape) of the input device to customize the input device to a user's preferences. The haptic structure may also be used as a force sensor to detect and measure user input at the input device.

In one embodiment, the haptic structure includes an electroactive polymer that deforms (including expanding or compressing) in response to an input signal. The deformation of the electroactive polymer may locally translate or deflect the haptic structure. This may produce a localized haptic effect at an input surface or contact layer of the electronic device. The deformation of the electroactive polymer may also move or conform the input surface of the electronic device to a user-customizable preference. For example, and as described herein, the electroactive polymer may adjust a height of a keyboard keycap with respect to a keyweb and/or openings in the keyweb in which the keycaps are positioned, or may adjust a height or dimension of another suitable input surface, or conform a wearable device to a shape of a user.

The electroactive polymer includes at least two electrodes separated by a compliant layer. The electrodes may be a conductive silicone rubber or other appropriate deformable material that flows or conducts electrical current. The compliant layer may be a non-conductive and flexible silicone or other appropriate material that substantially impedes the flow of electrical current between the electrodes.

The two electrodes separated by the compliant layer may define a deformable capacitor. A power source, charging system, processing unit, or other electrical component may be coupled with the deformable capacitor and configured to generate an input signal that electrically charges one or both of the electrodes of the deformable capacitor. This may generate an electrostatic force between the two electrodes that causes the two electrodes to move relative to one another. As the two electrodes move relative to one another, the compliant layer may be compressed. As one example, a perpendicular thickness of the compliant layer between the two electrodes may be reduced and a lateral width of the compliant layer may increase due to the movement of the two electrodes (e.g., the compliant layer may substantially flatten as the two electrodes move toward one another).

The deformable capacitor may be one of an array of deformable capacitors that forms the haptic structure. In a particular embodiment, the haptic structure may include a continuous compliant layer or sheet. A first group of electrodes may be positioned on, or within, a first portion of the compliant layer and a second group of electrodes may be positioned on, or within, a second portion of the compliant layer opposite the first portion. The first and second groups of electrodes may be aligned with one another such that corresponding ones of the first and second group of electrodes (and interposed portion of the compliant layer) are one of the array of deformable capacitors. This may allow the haptic structure to locally compress (deform) or deflect by selectively actuating particular ones of the array of deformable capacitors. For example, the input signal may be targeted to deform one of the array of deformable capacitors while another of the array of deformable capacitors remains substantially undeformed.

It will be appreciated that the electrodes of the haptic structure may be arranged in any appropriate orientation or combination to produce a compression or other deformation having a desired magnitude and direction. Broadly, as explained in greater detail below, the haptic structure may produce a haptic effect (e.g., including localized compressions/deformations or deflections) at least partially based on the orientation of the electrodes. As such, in one instance, the electrodes may be plates or sheets that are arranged such that a major surface of the electrodes is substantially parallel with an input surface (e.g., such as a trackpad, touchscreen, keyboard keycap, or the like). In other instances, the electrodes may be plates or sheets that are arranged such that major surfaces of the electrodes are positioned transverse to the input surface. Other orientations are contemplated, including haptic structures having various combinations of electrodes with different orientations.

Additionally or alternatively, and for any orientation, multiple electrodes (each separated by the compliant layer) may be stacked within the haptic structure. The haptic structure may produce an increased range of haptic effects using the stacked electrodes, for example, because the stacked electrodes may allow for greater travel or deflection. This may be helpful when using the haptic structure to replicate the sensation of a dome switch or other mechanical actuator that produces tactile feedback in response to a predetermined amount of travel.

As described herein, the haptic structure may be used with a variety of electronic devices and input devices. As one example embodiment, the haptic structure may be coupled with a keycap of a keyboard. The keycaps may be positioned within openings of a key web or other surface of an enclosure. Localized deformation of the haptic structure may produce localized haptic effects at the keycap, including haptic effects that move or translate part or all of the keycap in response to a user input. Additionally or alternatively, the haptic structure may alter a characteristic of the keycap to customize the keycap to a predetermined user preference. In a particular embodiment, the haptic structure may be coupled with the keycap and a housing surrounding the keycap. A thickness of the haptic structure may be reduced (e.g., due to the electrodes of the array of deformable capacitors moving toward one another). This may cause the keycap to move relative to the housing, thereby adjusting a height characteristic of the keycap to the user's preference. In some cases, the reduction in the thickness of the haptic structure may move the keycap between a first state, in which the keycap is substantially flush with an exterior surface of the housing (e.g., at least a portion retracted within an opening of the housing), and a second state, in which the keycap is raised above the exterior surface of the housing (e.g., at least a portion projecting above the opening of the housing).

The haptic structure may also be used with a trackpad, display, or other input surface of an electronic device. In one embodiment, the haptic structure may be positioned below a thin glass input surface or other contact layer. Localized deformation of the haptic structure may locally deform regions of the thin glass input surface. In this, and other embodiments, the haptic structure may also be used as a force sensor to detect and measure user input at the thin glass input surface. As described in greater detail below, the haptic structure may detect a change in a capacitance between a pair of electrodes separated by the compliant layer. The capacitance may change, for example, when the compliant layer deforms due to a compression, or other force input, at the thin glass input surface. In this regard, a stiffener or other rigid member may be positioned below the haptic structure to reinforce the haptic structure and the thin glass input surface. In other cases, the haptic structure may be used in conjunction with other components configured to display indicia on the input surface based on a function or state of the electronic device.

The haptic structure is also broadly configurable for use with various wearable electronic devices, including watches, gloves, glasses, or other devices that measure a movement and/or position of a user (often in three-dimensional space) to control a corresponding electronic device. The haptic structure includes many diverse applications within wearable devices, as described herein. In one embodiment, the haptic structure may be, or form a component of, a band, strap, fabric, or other securement mechanism of an electronic device. The haptic structure may expand and contract (due to movement of the electrodes within the deformable capacitor) to conform the securement mechanism to a shape of a user. This may allow a watch band, for example, to conform to the shape of user's wrist or a virtual or augmented reality glove to conform to the shape of a user's hand.

In other embodiments, the haptic structure may generate localized haptic effects corresponding to a position or movement of the wearable electronic device. For example, the haptic structure may be arranged within a flexible fabric that defines a glove, path, or other implement attachable to a user. A user may move or position the flexible fabric into various input configurations (e.g., gestures, symbols, signs, or the like) that may be used to control a computing device. The haptic structure may detect the input configuration of the flexible fabric (e.g., by detecting a change in a capacitance caused by the deformation of the haptic structure resulting from the input configuration). Additionally or alternatively, the haptic structure may locally deform in response to the identified input configuration. For example, the foregoing functionality may be used in connection with a virtual or augmented reality device to create an immersive environment. For example, a display may depict a virtual environment with which a user may control and tactilely interact, using the haptic structure within the flexible fabric.

The haptic structure, in any of the foregoing embodiments, may include other actuators, sensors, and feedback mechanisms. In a particular embodiment, the haptic structure may include a piezoelectric material coupled with the electroactive polymer, deformable capacitor, or the like described above. Analogous to the electroactive polymer, the piezoelectric material may deform in response to an input signal that induces a current flow through a portion of the piezoelectric material. The piezoelectric material may also exhibit a change in an electrical property in response to a deformation or strain within the piezoelectric material. Coupling the piezoelectric material and the electroactive polymer allows the haptic structure to produce a wider range of haptic effects.

To illustrate, when used individually, the electroactive polymer and the piezoelectric material exhibit distinct force-deflection properties. As explained in greater detail below, the electroactive polymer exhibits relatively high degrees of deflection and relatively low degrees of blocking force (e.g., the force generated by the actuator for a given deflection and electrical charge). In contrast, the piezoelectric material exhibits relatively low degrees of deflection and relatively high degrees of blocking force. Together, the coupled piezoelectric material and the electroactive polymer may exhibit relatively high degrees of deflection and relatively high degrees of blocking force. Thus, as described herein, the haptic feedback structure having the coupled piezoelectric material and the electroactive polymer may produce localized haptic effects having an increased magnitude for a corresponding deflection (e.g., of the contact layer).

It will be appreciated that the piezoelectric material and the electroactive polymer may be coupled and arranged in a variety of manners. For example, the piezoelectric material and the electroactive polymer may each be sheets stacked together. In other cases, the piezoelectric material and electroactive polymer may be spatially arranged in various positions and configurations, including in an alternating grid. The electroactive polymer may also include electrodes in a variety of orientations, as described above, such that the electroactive polymer may deform along a direction different from that of the piezoelectric material. In a further embodiment, the electroactive polymer may encapsulate or substantially surround the piezoelectric material. This may be accomplished by an overmolding process in which the electroactive polymer is molded over all or some of the surface of the piezoelectric material.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1A depicts a deformable capacitor 104, such as the deformable capacitors generally discussed above and described in greater detail below. The deformable capacitor 104 includes a pair of electrodes 108a, 108b and a compliant layer 112. The pair of electrodes 108a, 108b may be separated by the compliant layer 112. As shown, the pair of electrodes 108a, 108b may be a plate, sheet, or other layer positioned on, or formed with, opposing surfaces of the compliant layer 112. The compliant layer 112 is positioned between the pair of electrodes 108a, 108b and may have a thickness that is greater than a thickness of either or both of the pair of electrodes 108a, 108b. Other configurations of the deformable capacitor 104 are contemplated and described herein, including embodiments having electrodes and compliant layers of differing shapes and sizes.

The pair of electrodes 108a, 108b and the compliant layer 112 may have distinct electrical properties. The pair of electrodes 108a, 108b may conduct electrical current, whereas the compliant layer 112 may be non-conducting such that it substantially impedes the flow of electrical current. As such, the pair of electrodes 108a, 108b may be configured to exhibit an electrical charge. For example, a power source, charging system, processing unit, or other component may generate an input signal that causes the pair of electrodes 108a, 108b to exhibit an electrical charge. As shown in FIG. 1A, the electrode 108a may be electrically positively charged and the electrode 108b may be electrically negatively charged. The compliant layer 112 may remain substantially electrically uncharged and prevent or impede the formation of an electrically conductive path between the pair of electrodes 108a, 108b. By electrically charging the pair of electrodes 108a, 108b, the input signal may generate an electrostatic force between the pair of electrodes 108a, 108b. This may bias the pair of electrodes 108a, 108b to move relative to one another due to the electrostatic force.

The compliant layer 112 forms a barrier between the pair of electrodes 108a, 108b that allows movement of the pair of electrodes 108a, 108b, while preventing the pair of electrodes 108a, 108b from contacting one another. In particular, the compliant layer 112 may be constructed from a deformable or flexible material that yields or complies in response to an applied force. As such, movement of the pair of electrodes 108a, 108b due to the electrostatic forces may cause the compliant layer 112 to deform.

In a particular embodiment and as described in greater detail below with respect to FIG. 1C, movement of the pair of electrodes 108a, 108b may reduce a perpendicular thickness 116 of the compliant layer 112 and increase a lateral width 120 of the compliant layer 112. The pair of electrodes 108a, 108b may also be deformable, and thus change in size in a manner corresponding to the deformation of the compliant layer 112. Upon the cessation of the electrostatic force, the pair of electrodes 108a, 108b and compliant layer 112 may return to an undeformed shape (e.g., such that the perpendicular thickness 116 and the lateral width 120 return to an undeformed value).

The pair of electrodes 108a, 108b and the compliant layer 112 may be formed from any appropriate materials that exhibit the foregoing electrical and material properties. In a particular embodiment, the pair of electrodes 108a, 108b may be formed from a conductive silicone rubber and the compliant layer 112 may be formed from a non-conducting silicone film. Other materials are contemplated, including forming the pair of electrodes of 108a, 108b from an electrically conductive material having an elasticity that is different from the compliant layer 112 (e.g., such that the pair of electrodes 108a, 108b and the compliant layer 112 may deform at different rates).

Figure 1B:
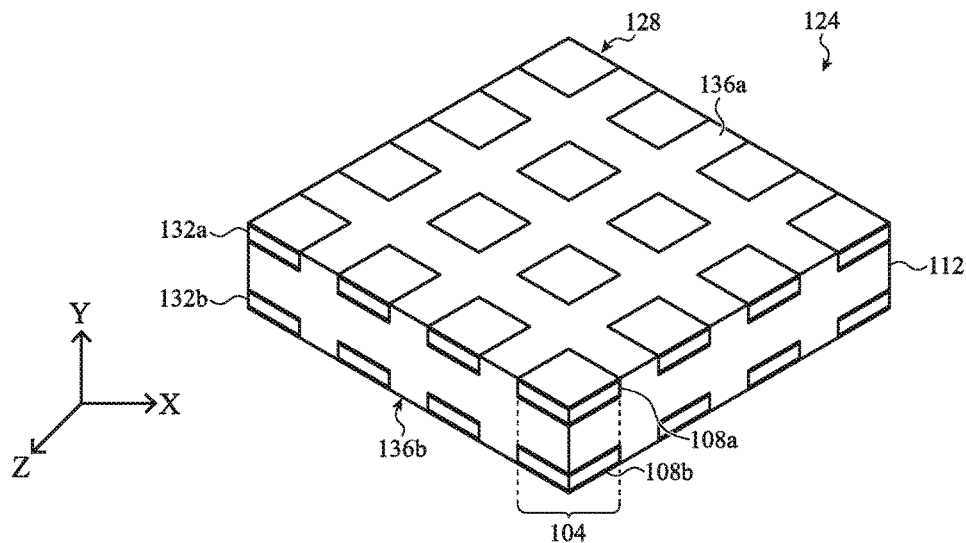
FIG. 1B depicts a sample haptic structure having one or more deformable capacitors.

The deformable capacitor 104 may be one of an array of deformable capacitors arranged in a grid or sheet to form a haptic structure. In this regard, FIG. 1B depicts a haptic structure 124 having an array of deformable capacitors 128. As shown in FIG. 1B, the haptic structure 124 may be a deformable sheet or haptic layer that includes the compliant layer 112 described with respect to FIG. 1A. The compliant layer 112 may be a continuous or unitary sheet within the haptic structure 124 that separates a first group of electrodes 132a positioned on, or within, a first portion of the compliant layer 112 (e.g., at first surface 136a) and a second group of electrodes 132b positioned on, or within, a second portion of the compliant layer 112 (e.g., at second surface 136b) opposite the first portion. Corresponding ones of the first and second group of electrodes 132a, 132b (and interposed portion of the compliant layer 112) may cooperate to define individual ones of deformable capacitors of the array of deformable capacitors 128. For example, the pair of electrodes 108a, 108b and interposed portion of the compliant layer 112 may define the deformable capacitor 104, which is one of the array of deformable capacitors 128.

Each of the array of deformable capacitors 128 may be substantially analogous to the deformable capacitor 104 described with respect to FIG. 1A. In this regard, each of the array of deformable capacitors 128 may be configured to deform in response to an electrostatic force generated between electrodes of a given deformable capacitor. In some cases, the array of deformable capacitors 128 may cooperate to globally deform the haptic structure 124. For example, a power source, charging system, processing unit, or the like may generate an input signal that generates an electrostatic force between the first and second groups of electrodes 132a, 132b. This may cause the first and second groups of electrodes 132a, 132b to move toward one another and compress the compliant material therebetween.

The array of deformable capacitors 128 may also allow the haptic structure 124 to locally deform. For example, a power source, charging system, processing unit, or the like may generate an input signal that generates an electrostatic force at selective ones of the array of deformable capacitors 128. As an illustration, the input signal may generate an electrostatic force at the deformable capacitor 104, while leaving other deformable capacitors of the array of deformable capacitors 128 substantially uncharged. This may deform the haptic structure 124 at the deformable capacitor 104 without substantially deforming or impacting other portions of the haptic structure 124.

The magnitude of the global or local deformation may be controlled by, for example, an associated computing device. In particular, a characteristic of the input signal may be modified or otherwise dynamically adjusted to produce varying degrees of deformation. For example, the voltage associated with the input signal may be altered to produce a desired deformation at the array of deformable capacitors 128. In some cases, the input signal may cause first and second ones of the array of deformable capacitors 128 to have distinct magnitudes of deformation or deflection.

The foregoing functionality of the haptic structure 124 may be used to produce haptic effects within an electronic device, as described herein. For example, the haptic structure 124 may form, or be coupled with, an input device (e.g., keyboard, trackpad, displays, wearable device, or the like) of an electronic device. The haptic structure 124 may globally or locally deform, as described above, to produce a tactile sensation at the input device corresponding to a function of the electronic device. The haptic structure 124 may also alter a characteristic of the input device (e.g., a size, shape, or the like) to conform the input device to a user's preferences, as described in greater detail below.

The haptic structure 124 may also operate as a capacitive force sensor. For example, the haptic structure 124 may be coupled with an input device such that the haptic structure 124 is deformed in response to a user input. Such deformation of the haptic structure 124 may be used to detect the user input and measure a corresponding magnitude and location of the user input. By way of illustration, a capacitance may be measured between electrodes of the array of deformable capacitors 128. The capacitance may vary based on this distance separating the electrodes. Thus, as the haptic structure 124 is depressed (causing a separation of the electrodes to decrease), a processor coupled with the haptic structure 124 may measure a change in capacitance between the electrodes. The change in capacitance may be correlated with a magnitude of the user input. The processor may determine a position of the user input at the haptic structure identifying which of the array of deformable capacitors 128 exhibit a change in capacitance. For example, a higher change in capacitance at the deformable capacitor 104 (as compared with others of the array of deformable capacitors 128) may be indicative of a user input at or near a region of the input device associated with the deformable capacitor 104.

Figure 1C:
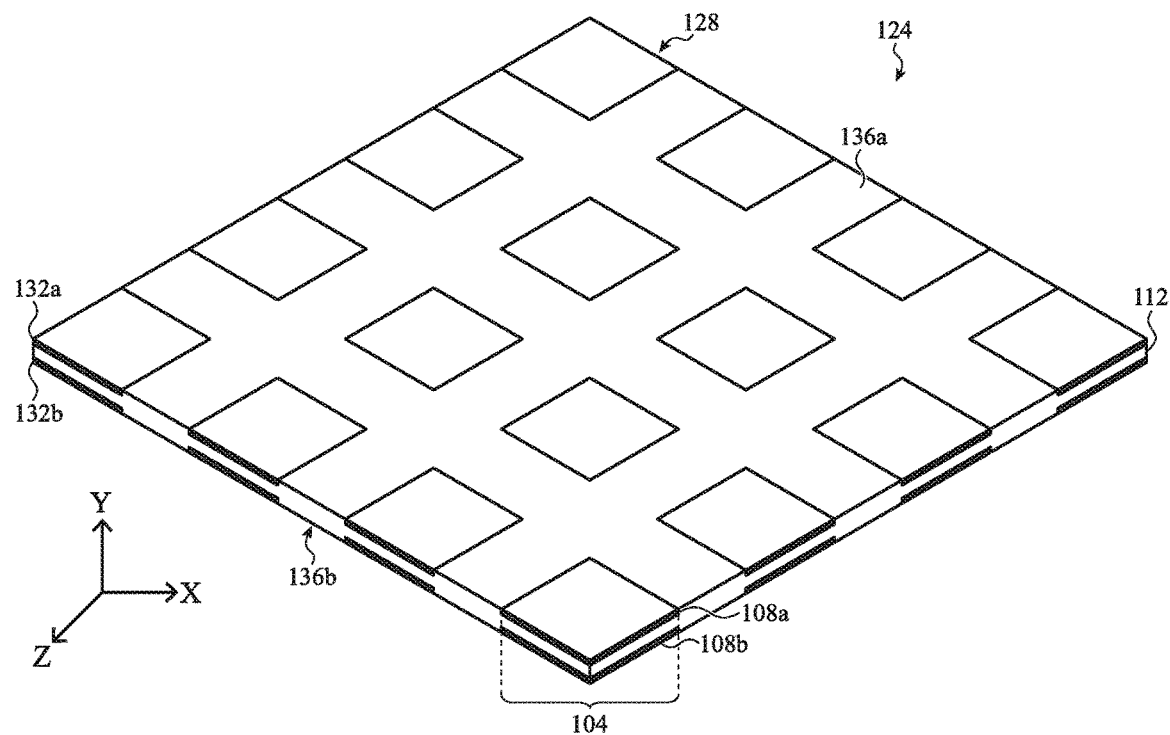
FIG. 1C depicts the haptic structure of FIG. 1B, in a state in which the haptic structure is globally deformed.

FIG. 1C depicts the haptic structure 124 in a state in which the haptic structure 124 is globally deformed. As described above with respect to FIG. 1A, a power source may generate an input signal that generates an electrostatic force between the first and second groups of electrodes 132a, 132b. As shown in FIG. 1C, this may cause the first and second group of electrodes 132a, 132b to move toward one another and compress the compliant material 112 therebetween. In particular, the movement of the first and second group of electrodes 132a, 132b in this manner may cause a cross-dimension of the haptic structure 124 to decrease along a y-direction while increasing one or more cross-dimensions of the haptic structure 124 along a z-direction and/or an x-direction. As depicted in FIG. 1C, the electrodes of the array of deformable capacitors 128 deform as the compliant material 112 deforms. As such, movement of the first and second group of electrodes 132a, 132b also causes a cross-dimension of the corresponding electrodes to decrease along a y-direction while increasing one or more cross-dimensions of the electrodes along a z-direction and/or an x-direction.

It will be appreciated that the haptic structure 124 generates various forces as a result of the depicted deformation. For example, the alteration of a cross-dimension of the haptic structure 124 along a y-direction may generate an axial or normal force along the y-direction. As the haptic structure 124 deforms and subsequently undeforms, its major surfaces (e.g., first and second surfaces 136a, 136b) move along the y-direction such that an object positioned adjacent the major surface of the haptic structure 124 (e.g., such as a touch screen) may experience force along the y-direction. Additionally or alternatively, the alteration of a cross-dimension of the haptic structure 124 along the z-direction and/or the x-direction may generate shear forces at the major surfaces of the haptic structure. As the haptic structure 124 deforms and subsequently undeforms, its major surfaces expand and contract along the z-direction and/or the x-direction such that an object positioned adjacent the major surface of the haptic structure 124 may experience shear forces acting in the z-direction and/or the y-direction.

Figure 1D:
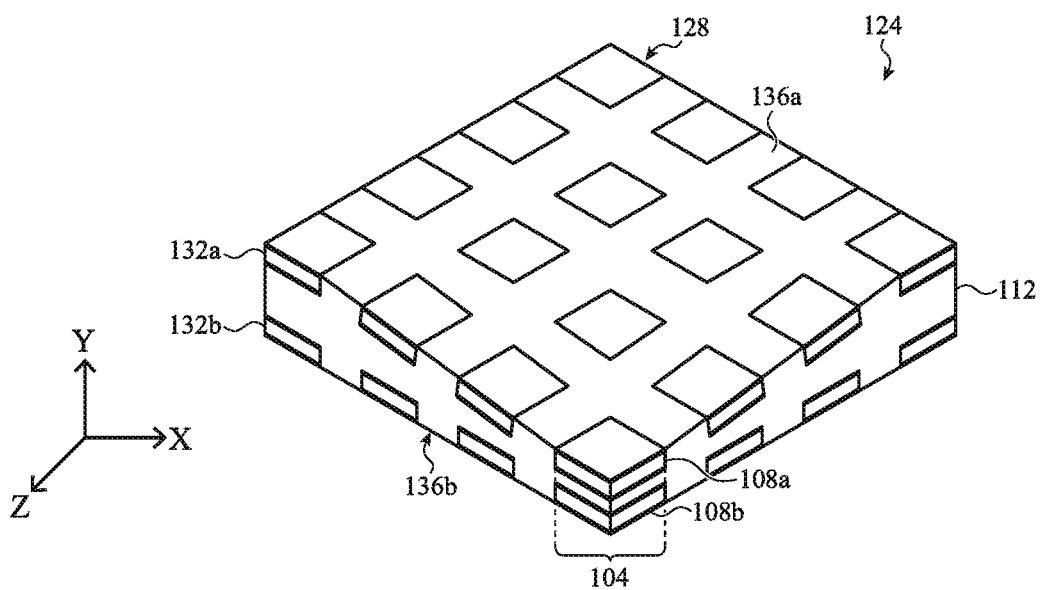
FIG. 1D depicts the haptic structure of FIG. 1B, in a state in which the haptic structure is locally deformed.

FIG. 1D depicts the haptic structure 124 in a state in which the haptic structure 124 is locally deformed. As described above with respect to FIG. 1A, a power source may generate an input signal that generates an electrostatic force at selective ones of the array of deformable capacitors 128, such as at the deformable capacitor 104. As shown in FIG. 1D, this may cause the pair of electrodes 108a, 108b to move toward one another and compress the compliant material therebetween. Other deformable capacitors of the array of deformable capacitors 128 may remain substantially undeformed.

Figure 2A:
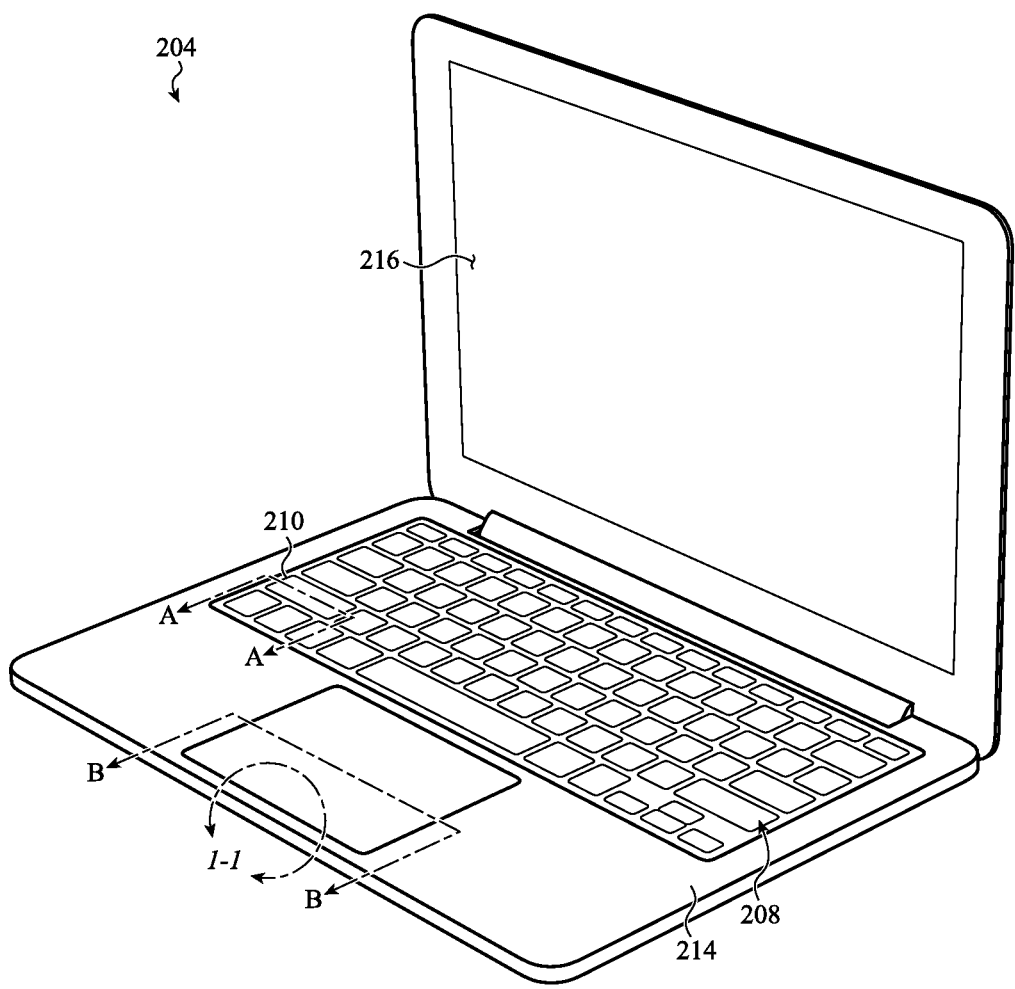
FIG. 2A depicts a top view of an electronic device having a haptic structure.

FIG. 2A depicts an example electronic device 204 having a keyboard assembly 208. Each key of the keyboard assembly 208 may include a "stack up" of layered components that cooperate to trigger a switch event in response to a force input. The keyboard assembly 208 may include a haptic structure 224 (not shown in 2A), such as the haptic structures, deformable sheets, haptic layers, or the like discussed above and described in greater detail below. In this regard, the haptic structure 224 may be substantially analogous to the haptic structure 124 described with respect to FIG. 1B. As described with respect to FIGS. 2A-2F, the haptic structure 224 may be used in a variety of manners within the electronic device 204. For example, the haptic structure 224 may be configured to detect a force input and/or produce haptic feedback at an input surface of the electronic device 204.

In a non-limiting example, as shown in FIG. 2A, the electronic device 204 may be a laptop computer. However, it is understood that electronic device 204 may be any suitable device that operates with the keyboard assembly 208 (or any other suitable device). Other examples of electronic devices may include wearable devices (including watches, glasses, rings, or the like), health monitoring devices (including pedometers, heart rate monitors, or the like), and other electronic devices. For purposes of illustration, FIG. 2A depicts the electronic device 204 as including the keyboard assembly 208, an enclosure 214, a display 216, and one or more input/output members 220. It should be noted that the electronic device 204 may also include various other components, such as one or more ports (e.g., a charging port, a data transfer port, or the like), communications elements, additional input/output members (including buttons), and so on. As such, the discussion of any computing device, such as computing device 204, is meant as illustrative only.

The keyboard assembly 208 may be positioned within the enclosure 214. In a non-limiting example shown in FIG. 2A, the keyboard assembly 208 may include a set of key caps 210. The set of key caps 210 may partially protrude from openings defined in the enclosure 214 and each key cap of the set of key caps 210 may be substantially surrounded by the enclosure 214 (e.g., they may be positioned within the openings defined through the enclosure). The set of key caps 210 may be configured to receive a force input. The force input may depress a particular one of the set of keycaps 210 to trigger one or more switch events that may control the electronic device 204. As depicted, the keyboard assembly 208 may be positioned within the electronic device 204. In an alternative embodiment, the keyboard assembly 208 may be a distinct, standalone component in electronic communication with the electronic device 204 via a wireless or hardwired connection.

FIGS. 2B-2F depict cross-sectional views of the electronic device 204 of FIG. 2A, taken along line A-A of FIG. 2A. In particular, FIGS. 2B-2F present cross-sectional views of alternate embodiments of haptic structure 224 at the keyboard assembly 208.

Figure 2B:
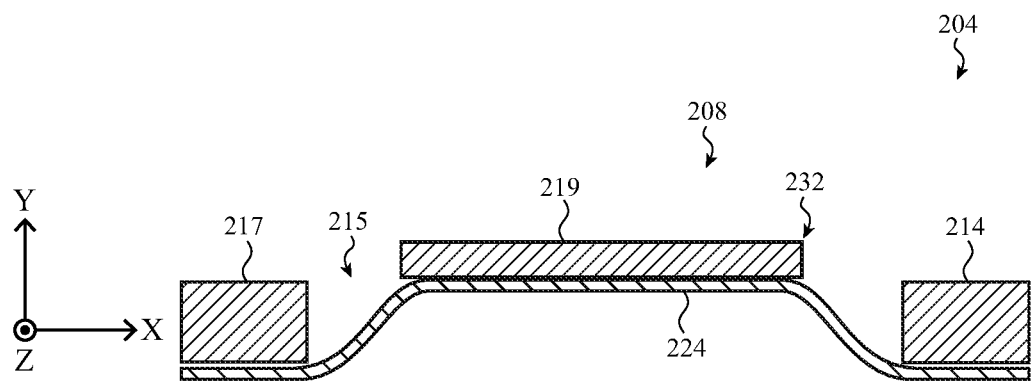
FIG. 2B depicts a cross-sectional view of the electronic device of FIG. 2A, taken along line A-A of FIG. 2A.

As illustrated in the embodiment of FIG. 2B, the electronic device 204 includes the keyboard assembly 208 positioned within the enclosure 214. For example, the enclosure 214 may define one or more openings 215 within which the keyboard assembly 208 is positioned. As shown, the keyboard assembly 208 includes a keycap 232 and the haptic structure 224. The keycap 232 may define an external input surface 219 of the keyboard assembly 208.

The haptic structure 224 may be coupled with the keycap 232 and the enclosure 214. The haptic structure 224 may be coupled with an underside surface of the keycap 232 and an underside surface of the enclosure 214. As shown in FIG. 2B, the haptic structure 224 may extend across the aperture 215 such that the keycap 232 is positioned on the haptic structure 224 within the aperture 215.

The haptic structure 224 may be configured to move the keycap along a y-direction. For example, a processing unit of the electronic device 204 may generate an input signal that deforms the haptic structure 224, as described with respect to FIGS. 1A-1D. The deformation of the haptic structure 224 may reduce and/or enlarge one or more cross-dimensions of the haptic structure 224 (e.g., including along one or more of the y-direction, x-direction, and/or z-direction). The keycap 232 may be coupled with the haptic structure 224 such that the reduction and/or enlargement of portions of the haptic structure 224 causes the keycap 232 to move along the y-direction. This may allow the keycap 232 to move within the aperture 215 such that a portion of the keycap 232 may extend beyond an exterior surface 217 of the enclosure 214.

In this regard, a processor of the electronic device 204 may use the haptic structure 224 to control the keycap 232 to move between a first state, in which the external input surface 219 of the keycap 232 is substantially flush with the exterior surface 217, and a second state, in which the external input surface 219 of the keycap 232 is raised above the exterior surface 217. This may allow the height of the keycap 232 to be customized to a user's preferences. For example, the external input surface 219 of the keycap 232 may be substantially flush with the exterior surface 217 when not in use, and may be raised above the exterior surface when being used to receive user input.

Figure 2C:
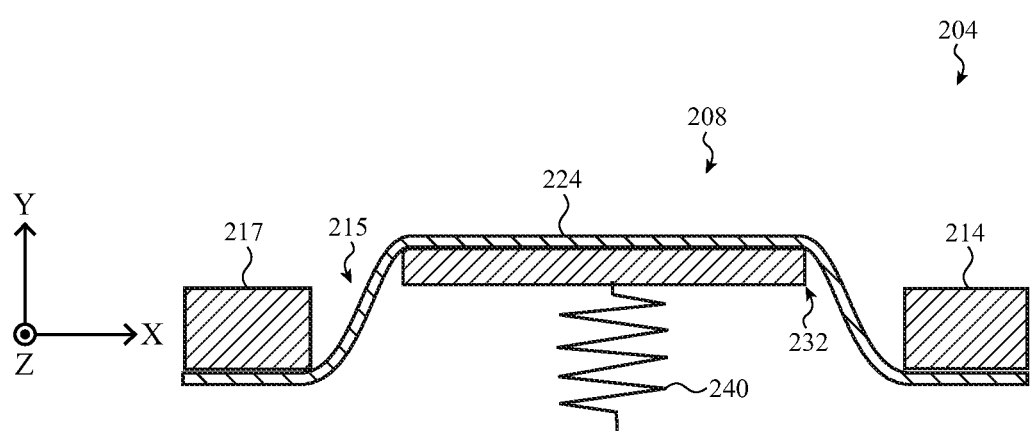
FIG. 2C depicts a cross-sectional view of another embodiment of the electronic device of FIG. 2A, taken along line A-A of FIG. 2A.

As illustrated in the embodiment of FIG. 2C, the keyboard assembly 208 may also include a biasing member 240. The biasing member 240 may be a spring or other mechanical or electrical component configured to exert a force on the keycap 232, for example, such as along the y-direction. In the embodiment of FIG. 2C, the spring is coupled with an underside surface of the keycap 232. As such, the spring 240 biases the keycap 232 toward a position raised above the exterior surface 217. The haptic structure 224, analogous to that described with respect to FIG. 2B, may extend across the aperture 215 and be coupled with the enclosure 214 and the keycap 232.

Notwithstanding the foregoing similarities, in the embodiment of FIG. 2C, haptic structure 224 may be coupled with a top surface of the keycap 232. The haptic structure 224 may be configured to deform in order to move the keycap 232 along the y-direction. The spring 240 may exert a force on the keycap 232. As such, deformations of the haptic structure 224 may counteract the force exerted by the spring 240 in order to move the keycap 232 along the y-direction. This may allow the electronic device 204 to bias the keycap 232 into a position that is raised above the exterior surface 217 when the haptic structure 224 is in an unactuated or non-electrical state. Subsequent actuations or electrically charging of the haptic structure 224 may reduce the height of the keycap 232 relative to the exterior surface 217 to produce haptic effects at the keycap 232 and/or customize the height of the keycap 232 to a user's preference.

Figure 2D:
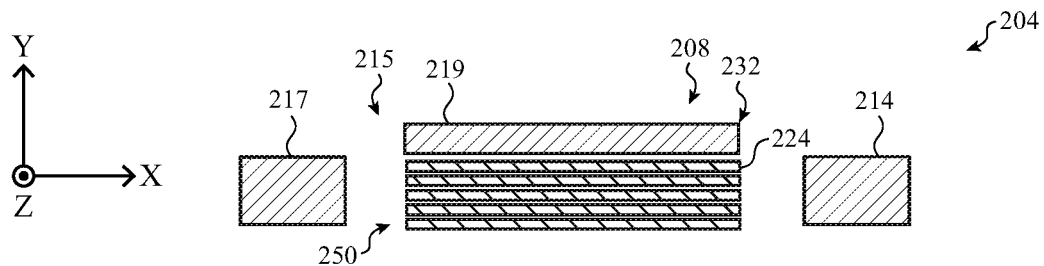
FIG. 2D depicts a cross-sectional view of another embodiment of the electronic device of FIG. 2A, taken along line A-A of FIG. 2A.

As illustrated in the embodiment of FIG. 2D, the haptic structure 224 may be one of an array of haptic structures 250. Each haptic structure 224 of the array of haptic structures 250 may be substantially analogous to the haptic structure 224. In this regard, each haptic structure 224 of the array of haptic structures 250 may deform in response to an electrostatic force generated between electrodes of a given haptic structure 224. Accordingly, the array of haptic structures 250 may cooperate to move the keycap 232 along the y-direction.

The array of haptic structures 250 may be positioned below the keycap 232 such that a major surface of the electrodes of a given haptic structure is positioned substantially parallel with an exterior surface of the keycap 232. In this regard, a processor of the electronic device 204 may be configured to generate an electrostatic force between electrodes of the array of haptic structures 250 that causes a cross-dimension of the array of haptic structures 250 to diminish along the y-direction, and return to an undiminished or undeformed dimension when the electrostatic force ceases. This may move the keycap 232 along the y-direction.

Stacking multiple haptic structures below the keycap 232 may increase a magnitude of haptic effects produced at the keycap 232. For example, the array of haptic structures 250 may be configured to move the keycap 232 along a greater range of travel along the y-direction. Additionally or alternatively, the array of haptic structures 250 may increase a magnitude of a force associated with the movement of the keycap 232 along the y-direction. For example, the array of haptic structures 250 may exhibit a force-deflection characteristic (e.g., a deflection exhibited at a particular blocking force, described in greater detail below with respect to FIGS. 10A and 10B) that is distinct from an individual haptic structure, such as the haptic structure 224.

It will be appreciated that the array of haptic structures 250 is depicted in FIG. 2D as individual haptic structures for purposes of illustration. For example, the array of haptic structures 250 depicted in FIG. 2D shows the orientation of the major surfaces of each of the array of haptic structures 250 being substantially parallel with the external input surface 219 of the keycap 232. However, in other cases, the array of haptic structures 250 may be a single, integrally formed component positioned below the keycap 232. For example, the array of haptic structures 250 may be defined by a single compliant layer (e.g., such as compliant layer 112) that separates multiple layers (e.g., three, four, or more layers) of electrodes positioned on or within the compliant layer. In this regard, a processor of the electronic device 204 may generate an input signal that causes an electrostatic force between some, or all, of the electrodes within the compliant layer to deform the array of haptic structures 250 (for example, by compressing at least a portion of the compliant layer), and thereby move the keycap 232 along the y-direction.

Figure 2E:
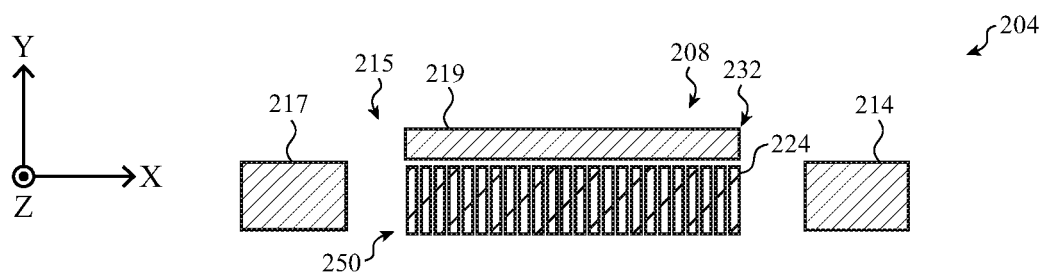
FIG. 2E depicts a cross-sectional view of another embodiment of the electronic device of FIG. 2A, taken along line A-A of FIG. 2A.

As illustrated in the embodiment of FIG. 2E, the array of haptic structures 250 may be positioned below the keycap 232 such that a major surface of the electrodes of a given haptic structure is positioned transverse to the external input surface 219 of the keycap 232. In this regard, a processor of the electronic device 204 may be configured to generate an electrostatic force between electrodes of the array of haptic structures 250 that causes a cross-dimension of the array of haptic structures 250 to diminish along the x-direction, and return to an undiminished or undeformed dimension when the electrostatic force ceases. The electrostatic force may also deform the array of haptic structures 250 such that a cross-dimension of the array of haptic structures 250 increases along the y-direction. This may move the keycap 232 along the y-direction.

Positioning the array of haptic structures 250 at distinct orientations below the keycap 232 may alter the magnitude of haptic effects produced at the keycap 232. For example, the array of haptic structures 250 may deform at a different rate and/or to a different displacement than the array of haptic structures 250 depicted in the embodiment of FIG. 2D. Additionally or alternatively, the orientation of the array of haptic structures 250 may influence the positioning of the keycap 232 when the array of haptic structures 250 is in an actuated versus an unactuated state. As one example, the generation of an electrostatic force within the array of haptic structures 250 of FIG. 2D may move the keycap 232 in a negative y-direction, into the enclosure 214, as a cross-dimension of the array of haptic structures 250 generally decreases along the y-direction in response to the generated electrostatic force. In contrast, the generation of an electrostatic force within the array of haptic structures 250 of FIG. 2E may move the keycap 232 in a positive y-direction, away from the enclosure 214, as a cross-dimension of the array of haptic structures 250 generally increases along the y-direction in response to the generated electrostatic force.

Figure 2F:
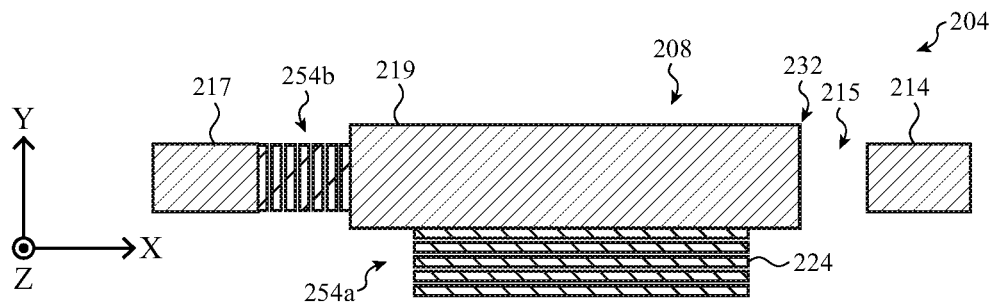
FIG. 2F depicts a cross-sectional view of another embodiment of the electronic device of FIG. 2A, taken along line A-A of FIG. 2A.

As illustrated in FIG. 2F, the keyboard assembly 208 may also include multiple arrays of haptic structures. Each one of the multiple arrays of haptic structures may be positioned on or near unique portions of the keycap 232 and configured to move the keycap 232 in one or more of a y-direction, an x-direction, and/or a z-direction.

As shown in the FIG. 2F, the keyboard assembly 208 may include a lateral array of haptic structures 254a and a perpendicular array of haptic structures 254b. The lateral and perpendicular arrays of haptic structures 254a, 254b may be substantially analogous to the array of haptic structures 250 described with respect to FIGS. 2D-2E. For example, the lateral and perpendicular arrays of haptic structures 254a, 254b may be configured to deform in response to an electrostatic force generated by an input signal from a processor of the electronic device 204.

The lateral array of haptic structures 254a may be coupled with an underside surface of the keycap 232. The lateral array of haptic structures 254a may have electrodes with major surfaces that are substantially parallel to the external input surface 219. In this manner, the lateral array of haptic structures 254a may be configured to move the keycap 232 along the y-direction in substantially the same manner as the array of haptic structures 250 described with respect to FIG. 2D.

The perpendicular array of haptic structures 254b may be coupled with a side surface of the keycap 232. In some cases, the perpendicular array of haptic structures 254b may be coupled with the keycap 232 such that the array of perpendicular haptic structures 254b substantially surrounds or encircles the keycap 232. The perpendicular array of haptic structures 254b may have electrodes with major surfaces that are transverse to the external input surface 219. Due to the positioning of the perpendicular array of haptic structures 254b around a perimeter of the keycap 232, deformation of the perpendicular array of haptic structures 254b may be configured to move the keycap 232 along one or more of the x-direction and the z-direction.

Accordingly, the lateral and perpendicular arrays of haptic structures 254a, 254b may cooperate to move the keycap 232 in one or more of a y-direction, x-direction, and/or z-direction. For example, the lateral and perpendicular arrays of haptic structures 254a, 254b may be selectively deformed such that the keycap 232 moves along a vector with a non-zero component along one or more of the y-direction, x-direction, and/or z-direction. This may allow the electronic device 204 to position the keycap 232 into various unique positions in a three-dimensional coordinate system. Such unique positioning may be used to tailor the height of the keycap 232 to a user's preferences. Additionally or alternatively, this may allow the electronic device 204 to generate tactilely distinguishable haptic effects by moving the keycap 232 into different positions. The distinguishable haptic effects may be indicative of particular functions of the electronic device 204, such that the user receives an acknowledgement of execution of the particular function via the haptic effect.

Figure 3A:
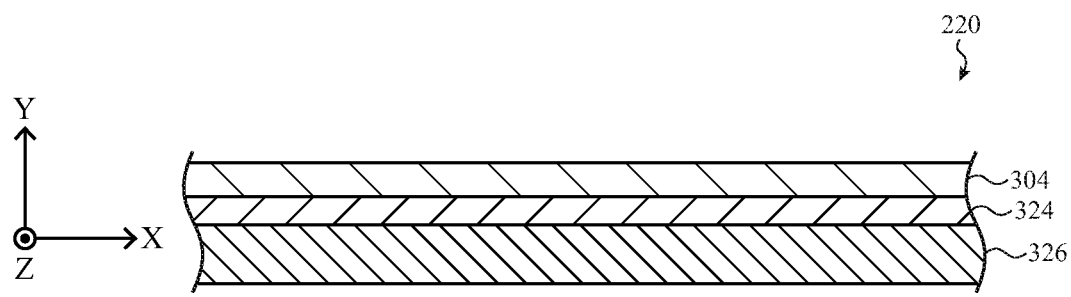
FIG. 3A depicts a cross-sectional view of the electronic device of FIG. 2A take along line B-B of FIG. 2A.

FIG. 3A is a cross-sectional view of the input/output member 220 of FIG. 2A, taken along line B-B of FIG. 2A. As illustrated, the input/output member 220 includes a contact layer 304, a haptic structure 324, and a substrate 326. The contact layer 304, the haptic structure 324, and the substrate 326 may cooperate to produce various haptic effects and/or measure a force input at the input/output member 220.

The contact layer 304 may be a substantially thin glass substrate. For example, the contact layer 304 may be a silica, sapphire, or other ceramic layer having a thickness that may be 100 micrometers. In some cases, the contact layer 304 may have a thickness that is more or less than 100 micrometers. The contact layer 304 forms an exterior input surface of the electronic device 204. In this regard, the contact layer 304 may be sufficiently durable and resilient to withstand a force input without fracturing or otherwise being damaged. Additionally, the contact layer 304 may be sufficiently compliant such that it locally deforms or deflects in response to deformation of the haptic structure 324 positioned below the contact layer 304. In some embodiments, for example, as described in greater detail below with respect to FIGS. 5A and 5B, the contact layer 304 may be a substantially transparent component.

The haptic structure 324 may be substantially analogous to the haptic structure 124 described with respect to FIG. 1B. In this regard, the haptic structure 324 may be configured to locally deform in response to an electrostatic force generated between electrodes of the haptic structure 324. Additionally, the haptic structure 324 may be used to measure a force input, as described herein. In the embodiment of FIG. 3A, the haptic structure 324 may have a thickness of between 20 micrometers and 50 micrometers. In some cases, the haptic structure 324 may be greater than 50 micrometers and less than 20 micrometers.

The haptic structure 324 may be positioned below the contact layer 304. In some cases, the haptic structure 324 may be coupled directly to an underside surface of the contact layer 304. A processor of the electronic device 204 may generate an electrostatic force between electrodes of the haptic structure 324 to cause the haptic structure 324 to locally deform. The localized deformations of the haptic structure 324 may cause the contact layer 304 to correspondingly deform or deflect. For example, the haptic structure 324 may be configured to locally deform along the y-direction. This may cause a corresponding portion of the contact layer 304 to deform or deflect. As such, the electronic device 204 may use the haptic structure 324 to produce localized deformations at the input/output member 220. The localized deformations of the input/output member 220 may be haptic effects that correspond to various functions of the electronic device 204.

The haptic structure 324 may also be used to measure a force input at the input/output member 220. For example, a force input received at an exterior surface of the contact layer 304 may locally deform or deflect the contact layer 304 and the haptic structure 324. As explained in greater detail above with respect to FIGS. 1A-1B, the haptic structure 324 may be configured to measure a magnitude and a position of the force input.

The substrate 326 is positioned below the haptic structure 324. In some cases, the substrate 326 may be coupled to an underside surface of the haptic structure 324. The substrate 326 may be a substantially rigid member that structurally reinforces the haptic structure 324 and the contact layer 304. In this regard, the substrate 326 may remain substantially undeformed while the haptic structure 324 and/or the contact layer 304 deforms or deflects. The substrate 326 may have a thickness of 200 micrometers. In some cases, the substrate 326 may have a thickness that is less than 200 micrometers or more than 200 micrometers. The substrate 326 may be formed from any appropriate material that exhibits the foregoing characteristics. In a particular embodiment, the substrate 326 may be formed from a rigid, nonconductive material, such as a hardened plastic. Additionally or alternatively, the substrate 326 may be, or form, a component of a printed circuit board (PCB) that is electrically coupled with the haptic structure 324.

Figure 3B:
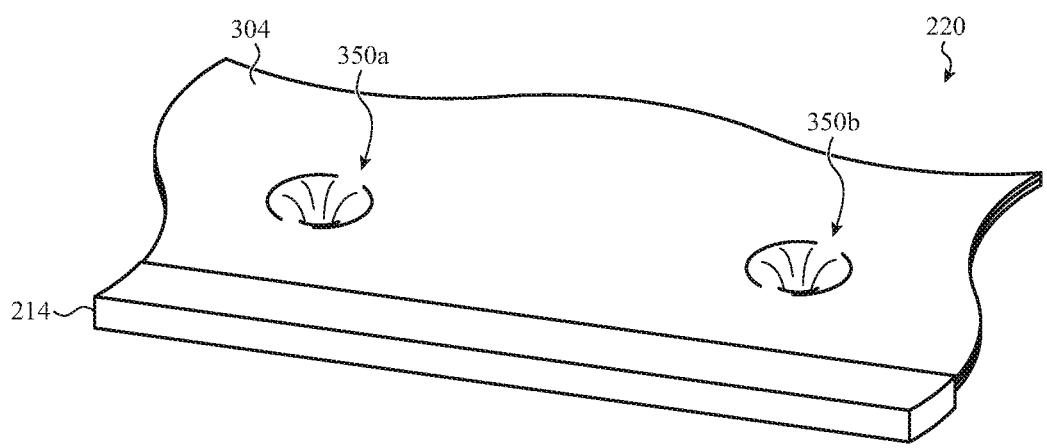
FIG. 3B depicts an enlarged view of the electronic device of FIG. 2A, taken at detail 1-1 of FIG. 2A.

FIG. 3B depicts detail 1-1 of FIG. 2A of the input/output member 220. As shown in the non-limiting example of FIG. 3B, the input/output member 220 is shown in a state in which the contact layer 304 exhibits one or more localized deflections based on the deformation of the haptic structure 324 (not shown in FIG. 3B). In this regard, FIG. 3B depicts contact layer 304 having localized deflections 350a, 350b. The localized deflections 350a, 350b may represent portions of the contact layer 304 that have moved along the y-direction. Such movement along the y-direction may be due to corresponding deformations of the haptic structure 324 positioned below contact layer 304.

Figure 4A:
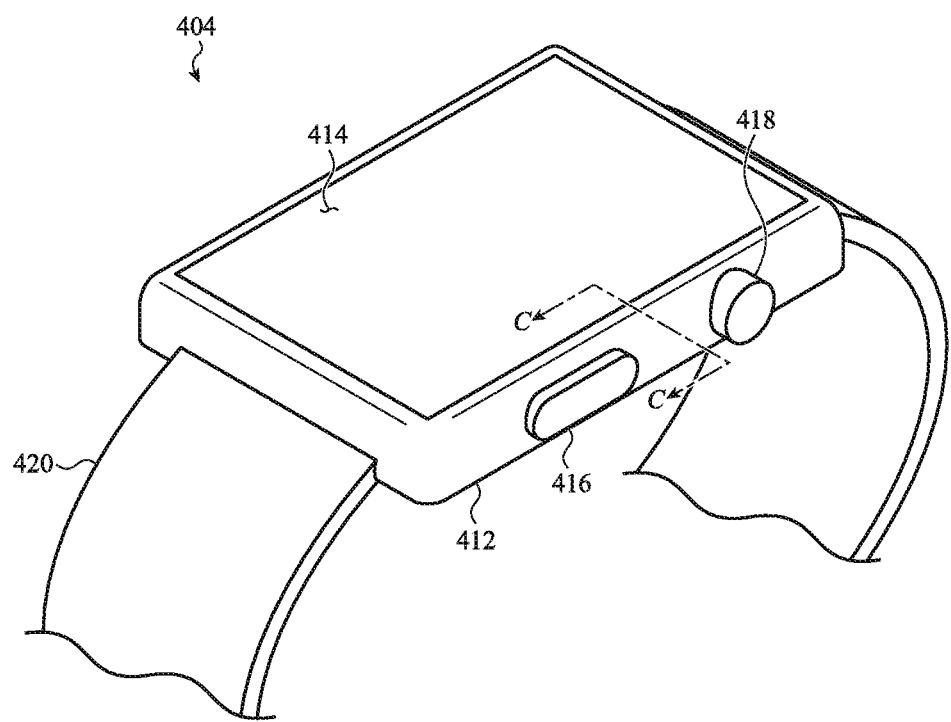
FIG. 4A depicts a top view of an electronic device having a haptic structure, according to another embodiment.

FIG. 4A depicts an example electronic device 404. The electronic device 404 may include a haptic structure 424 (not shown in FIG. 4A), such as the haptic structures discussed above and described in greater detail below. In this regard, the haptic structure 424 may be substantially analogous to the haptic structure 124 described with respect to FIG. 1B. As described with respect to FIGS. 4B and 4C (not shown in 4C), the haptic structure 424 may be used in a variety of manners within the electronic device 404. For example, the haptic structure 424 may be configured to detect a force input and/or produce haptic feedback at an input surface of the electronic device 404. Additionally or alternatively, the haptic structure 424 may be configured to facilitate attachment of the electronic device 404 to a user (e.g., by conforming a securement mechanism of the electronic device 404 to a shape of a user).

As a non-limiting example, as shown in FIG. 4A, the electronic device 404 may be a wearable electronic device, such as a watch. However, it is understood that electronic device 404 may be any suitable wearable electronic device that operates with the haptic structure 424. Other examples of other wearable electronic devices may include watches of other configurations, glasses, rings, health monitoring devices (including pedometers, heart rate monitors, or the like), and other electronic devices. For purposes of illustration, FIG. 4A depicts the electronic device 404 as including a housing 412 (e.g., a watch body); a display 414; one or more input/output members 416; a crown 418; and a band 420. It should be noted that the electronic device 404 may also include various other components, such as one or more ports (e.g., charging port, data transfer port, or the like), additional input/output buttons, and so on. As such, the discussion of any electronic device, such as electronic device 404, is meant as illustrative only.

Figure 4B:
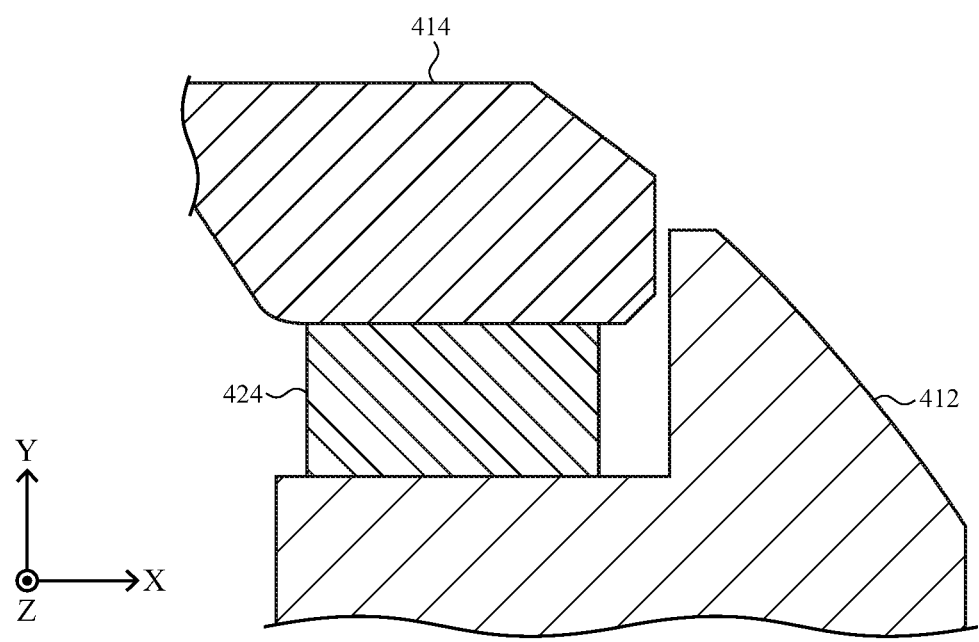
FIG. 4B depicts a cross-sectional view of the electronic device of FIG. 4A, taken along line C-C of FIG. 4A.

FIG. 4B is a cross-sectional view of the electronic device of FIG. 4A, taken along line C-C of FIG. 4A. As illustrated, the electronic device 404 includes the display 414, the haptic structure 424, and the housing or watch body 412. The haptic structure 424 may be positioned between the display 414 and the housing 412. In a particular embodiment, the haptic structure 424 may form a ring extending about a periphery of the display 414.

The haptic structure 424 may be coupled with the display 414 such that a force input received at an exterior surface of the display 414 may cause the haptic structure 424 to deform. In this regard, the haptic structure 424 may be configured to detect a magnitude of a force input received at the display 414, as described herein. As explained in greater detail above with respect to FIGS. 1A and 1B, the deformation of the haptic structure 424 may change a capacitance between electrodes of the haptic structure 424. A processor of the electronic device 404 may correlate the change in capacitance with a magnitude of the corresponding force input. This may allow the display 414 to define an input surface of the electronic device 404. For example, a user may deliver a force input to the display 414 to control a function of the electronic device 404.

Additionally or alternatively, the electronic device 404 may use the haptic structure 424 to produce a haptic effect at the display 414, such as moving the display 414 along a y-direction. The electronic device 404 may generate an electrostatic force with the haptic structure 424 that causes a cross-dimension of the haptic structure 424 to reduce or diminish along the y-direction. The display 114 may be coupled to the haptic structure 424 such that it correspondingly moves along the y-direction with the deformations of the haptic structure 424.

Figure 4C:
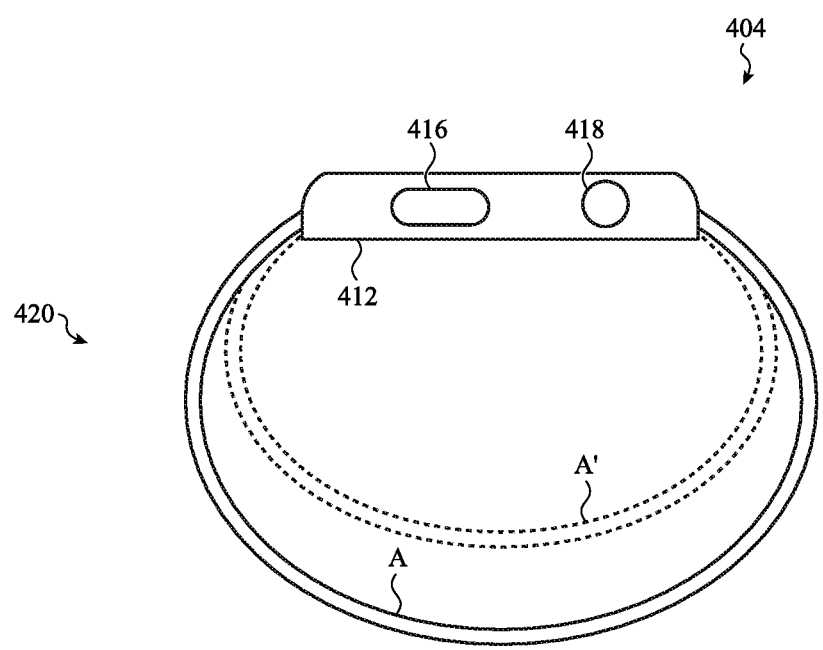
FIG. 4C depicts a side view of the electronic device of FIG. 4A having a dynamically adjustable band.

FIG. 4C depicts a side view of the electronic device of FIG. 4C. As illustrated, the electronic device 404 includes the band 420. The band 420 may be a fabric or textile band, lanyard, strap, or the like formed from any appropriate material (e.g., including nylon, fluoroelastomeric polymer, or other suitable polymers). More broadly, the band 420 may be any appropriate "soft good" material that exhibits sufficiently compliant and flexible characteristics. For example, the band 420 may be sufficiently elastic or resilient such that the band 420 may not be permanently deformed upon the application of force (e.g., the band 420 may substantially return to an original or undeformed shape after the application of a localized force). The band 420 may not be limited to the above exemplary materials, and may also include other appropriate materials consistent with the various embodiments presented herein, including silicone, plastic or other flexible materials.

As shown in FIG. 4C, the band 420 may be coupled to opposite ends of the housing 412. The band 420 may be configured to attach the electronic device 404 to a user. In a particular embodiment, the band 420 may be configured to expand and contract to conform the band 420 to a shape of a user.

To facilitate the foregoing, the band 420 may include, or be defined by, the haptic structure 424. For example, the haptic structure 424 may be positioned within a flexible fabric of the band 420 and extend along a contour of the band 420 between the opposing ends of the housing 412. The haptic structure 424 may be coupled with a processing unit, power source, or other component of the electronic device 404 that is configured to generate an input signal. That input signal may generate an electrostatic force between electrodes of the haptic structure 424. Subsequently, the haptic structure 424 may deform such that one or more cross-dimensions of the haptic structure 424 is altered. The haptic structure 424 may be coupled with the band 420 such that the deformations of the haptic structure 424 alter a size and/or a shape of the band 420. In a particular embodiment, the deformations of the haptic structure 424 are configured to alter a size and/or shape of the band 420 to conform to a shape of a user.

For example, as depicted in FIG. 4C, such deformations of the haptic structure 424 may deform causing the band to transition between band shape A and band shape A' (shown in phantom line). The band shape A' may be a shape that conforms the band 420 to a user's wrist, whereas the band shape A may be a shape that is larger than a user's wrist. Band shape A' may be adjustable. For example, the electronic deice 404 may control the electrostatic force generated within the haptic structure 424 to increase or decrease a size of the band 420 such that it correctly conforms to a given user's wrist. This may allow multiple users (having different wrist sizes) to use the band 420. This may also allow the band 420 to be constructed free of clasping mechanisms, for example, that connect separated halves of a sample band. However, such clasping mechanisms may be used with the band 420, as may be desired for aesthetic purposes.

Figure 5A:
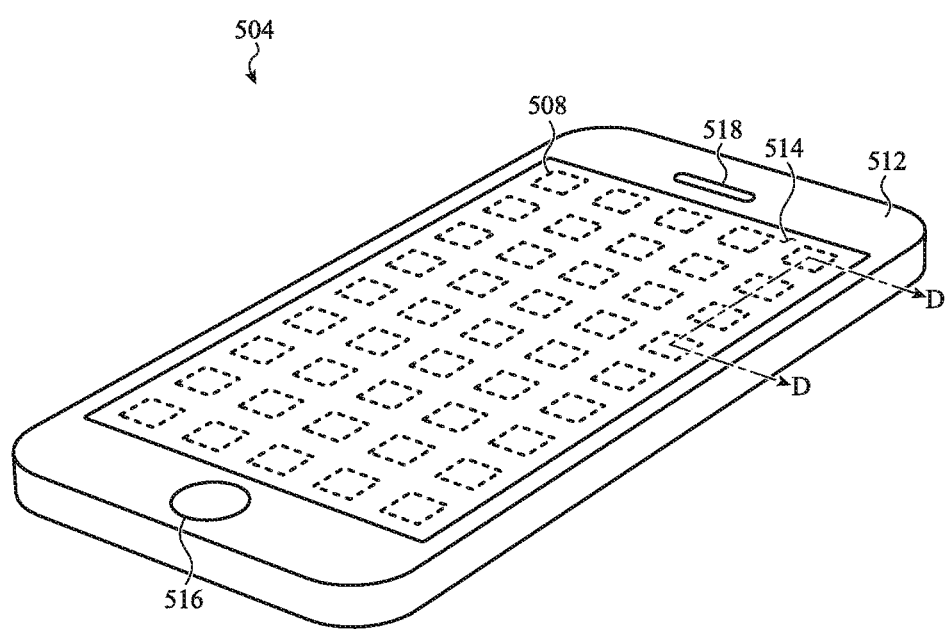
FIG. 5A depicts a top view of an electronic device having a haptic structure, according to another embodiment.

FIG. 5A depicts an example electronic device 504. The electronic device 504 may include a haptic structure 524 (not shown in FIG. 5A), such as the haptic structures, deformable sheets, haptic layers, or the like discussed above and described in greater detail below. In this regard, the haptic structure 524 may be substantially analogous to the haptic structure 124 described with respect to FIG. 1B. As described with respect to FIGS. 5A and 5B, the haptic structure 524 may be used in a variety of manners within the electronic device 504. For example, the haptic structure 524 may be configured to detect a force input and/or produce haptic feedback at an input surface of the electronic device 504.

In a non-limiting example, as shown in FIG. 5A, the electronic device 504 may be a mobile phone. However, it is understood that electronic device 504 may be any suitable device having an input surface. Other examples of other electronic devices may include wearable devices (including watches, gloves, glasses, rings, or the like), health monitoring devices (including pedometers, heart rate monitors, or the like), and other electronic devices. For purposes of illustration, FIG. 5A depicts the electronic device 504 as including a housing 512; a display 514; one or more input/output members 516; and a speaker 518. It should be noted that the electronic device 504 may also include various other components, such as one or more ports (e.g., charging port, data transfer port, or the like), additional input/output buttons, and so on. As such, the discussion of any electronic device, such as electronic device 504, is meant as illustrative only.

As shown in FIG. 5A, the display 514 may include an array of haptic pixels 508 (shown in phantom line). Each of the array of haptic pixels 508 may correspond to a portion of the display 514 below which a deformable capacitor of the haptic structure 524 (not shown in FIG. 5A) is positioned. As explained in greater detail in FIG. 1B, the haptic structure 524 may include an array of deformable capacitors 528. The electronic device 504 may be configured to generate an electrostatic force between electrodes of selective ones of the array of deformable capacitors 528. This may cause the deformable capacitor to selectively deform. The display 514 may be coupled with the haptic structure 524 such that the selective deformations of the haptic structure 524 cause the display 514 to deform or deflect at a corresponding one of the array of haptic pixels 508 of the display 514.

The array of haptic pixels 508 may also be used to determine a location of a force input on the display 514. As explained in greater detail above with respect to FIGS. 1A and 1B, a capacitance measured between electrodes of each of the array of deformable capacitors 528 may change as the electrodes move toward one another. A processor of the electronic device 504 may correlate the change in capacitance with a force input. The processor may also identify a location of the force input by determining particular ones of the array of deformable capacitors 528 that exhibit a change in capacitance.

Figure 5B:
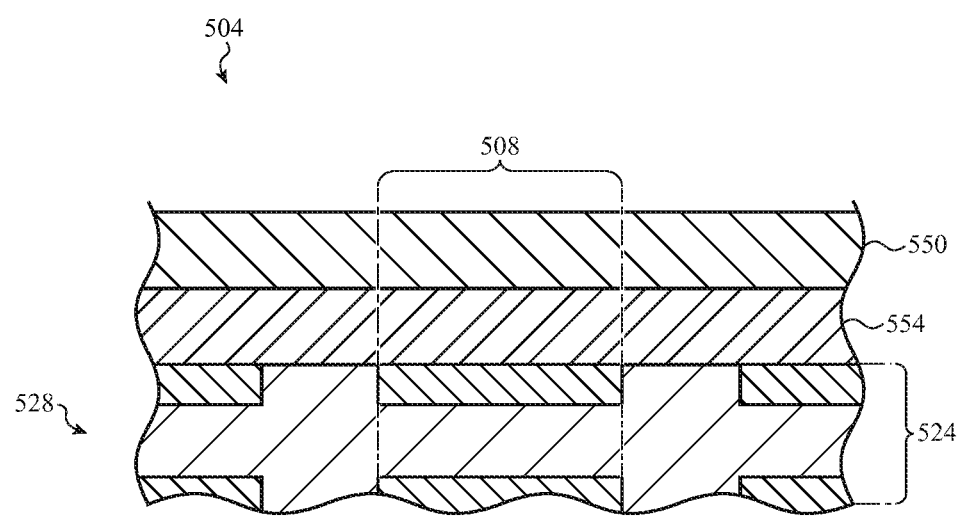
FIG. 5B depicts a cross-sectional view of an electronic device of FIG. 5A, taken along line D-D of FIG. 5A.

FIG. 5B is a cross-sectional view of the electronic device of FIG. 5A, taken along line D-D of FIG. 5A. As illustrated, the electronic device 504 includes a transparent layer 550, the haptic structure 524, and an illumination layer 554. The haptic structure 524 may be positioned below the transparent layer 550 and includes the array of deformable capacitors 528. As described above with respect to FIG. 5A, one of the array of deformable capacitors 528 may be positioned below the transparent layer 550 and define a corresponding one of the array of haptic pixels 508. Accordingly, as electrodes of the deformable capacitor positioned below the corresponding haptic pixel move toward one another, the transparent layer may locally deform or deflect at the haptic pixel.

The transparent layer 550 may be formed from silica glass, sapphire, or any other appropriate transparent material that is configured to display an output of the electronic device 504. In this regard, the illumination layer 554 may be coupled with the transparent layer 550 and configured to selectively illuminate portions of the transparent layer 550. The illumination layer 554 may illuminate the transparent layer 550 to indicate one or more functions of the electronic device 504. For example, the illumination layer 554 may be configured to display an updated set or arrangement of virtual symbols at the dimensionally configurable input region indicative of the particular function. The illumination layer 554 may display the symbol on the transparent layer 550 at or near one or more of the array of haptic pixels 508. In this manner, the electronic device 504 may produce haptic effects at the one or more of the array of haptic pixels 508 that correspond to the illuminated function of the electronic device 504. Further, the electronic device 504 may use the haptic structure 524 to measure a force input at the one or more of the arrays of haptic pixels 508 that correspond to the illuminated function of the electronic device 504.

Figure 6A:
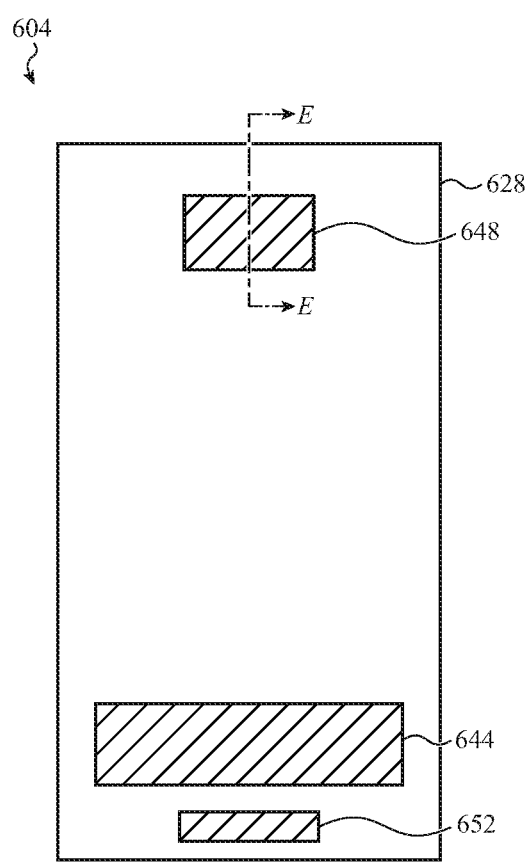
FIG. 6A depicts a top view of an electronic device having a haptic structure, according to another embodiment.

FIG. 6A depicts an electronic device 604. The electronic device 604 may include measurement circuitry to determine a position and/or input configuration of the electronic device 604. The electronic device 604 may also include a haptic structure configured to provide haptic feedback based on the identified input configuration of the electronic device 604 and/or in response to an instruction from an associated computing device.

In this regard, the electronic device 604 may include a haptic structure 624 (not shown in FIG. 6A), such as the haptic structures, deformable sheets, haptic layers, or the like discussed above and described in greater detail below. In this regard, the haptic structure 624 may be substantially analogous to the haptic structure 124 described with respect to FIG. 1B. As described with respect to FIGS. 6A-6D, the haptic structure 624 may be used in a variety of manners within the electronic device 604. For example, the haptic structure 624 may be configured to detect a force input and/or produce haptic feedback at an input surface of the electronic device 604. Additionally or alternatively, the haptic structure 624 may be configured to facilitate attachment of the electronic device 604 to a user (e.g., by conforming a securement mechanism of the electronic device 604 to a shape of a user).

The electronic device 604 includes a flexible fabric 628. The flexible fabric 628 may be a conformable material configured to attach to a user at one or more locations. Accordingly, the flexible fabric 628 may be formed from any appropriate "soft good" material (e.g., leather, textiles, fibers, vinyl, or the like) that exhibits sufficiently compliant and flexible characteristics such that the flexible fabric 628 may conform to a surface of the user (e.g., such as a fabric glove conforms to the shape of a user's hand). For example, the flexible fabric 628 may include a first portion (or first attachment piece) configured to attach to a user at a first location and a second portion (or second attachment piece) configured to attach to a user at a second location. The flexible fabric 628, using the haptic structure 624 described herein, may expand and contract to conform the flexible fabric 628 to the user.

The flexible fabric 628 or other material of the electronic device 604 may define a wearable item (e.g., such as a glove or separate attachment pieces configured to conform to a user's hand) that includes an array of sensors or measurement circuitry that detect motion of the user input device as it moves through a three-dimensional space. The user input device may be positioned or moved in, or moved through, a variety of input configurations (e.g., including motion patterns, gestures, signs, finger or hand positions, or the like) that are used to provide input to a computing device free of any defined or static user input surface. In one embodiment, a first portion of the flexible fabric may be moved relative to a second portion of the flexible fabric to define an input configuration. The input configuration may correspond to a predetermined function executable by an interconnected computing device. Accordingly, the user input device may be positioned or moved into an input configuration in the air and/or relative to any appropriate or adjacently disposed surface to control a computing device. In this regard, the user input device may be suitable for use with various electronic devices (e.g., a computer, laptop, tablet, smart phone, or the like).

The electronic device 604 may be used to control or interact with a virtual environment represented on a virtual reality device (not shown in FIG. 6A). The virtual reality device may include any appropriate device configured to create a visually immersive three-dimensional environment. For example, the virtual reality device may be defined by glasses, goggles, headsets, or the like that are configured to encompass or substantially surround a user's eyes to create a sensory experience that simulates a user's presence in a virtual environment. Additionally or alternatively, a virtual reality device may be a computing device configured to create a holographic projection in real space. Accordingly, a virtual object represented by, or on, a computing device may be a virtual object represented within the visually immersive three-dimensional environment created by a virtual reality device.

In one embodiment, the electronic device 604 may manipulate a virtual environment (e.g., as represented by a virtual reality device) by performing various input configurations. For example, a representation of the user input device may be depicted within the virtual environment (e.g., a virtual representation of the user's hands may be represented within the virtual environment). Further, manipulations of the electronic device 604 in real space (e.g., such as that corresponding to a particular input configuration) may also be represented within the virtual environment. In some instances, the manipulation of the electronic device 604 may alter the virtual environment. In turn, the electronic device 604 may produce various haptic effects using the haptic structure 624, and other haptic elements, in response to the altering of the virtual environment, as described herein. Accordingly, the combination of the electronic device 604 and the virtual reality device may create an encompassing sensory experience that allows a user to experience, interact, and/or control a virtual environment in a manner analogous to a user's interactions with a corresponding physical environment.

To facilitate the foregoing, the electronic device 604 includes multiple sensing regions (e.g., localized sensing regions). In one embodiment, the electronic device 604 includes a primary sensing region 644. The primary sensing region 644 may detect global movements of the electronic device 604. For example, the primary sensing region 644 may detect the translation of the electronic device 604 between a first position and a second position. The primary sensing region 644 may be disposed, for example, at a central region of the electronic device 604, such as proximal to a user's palm. The primary sensing region 644 includes measurement circuitry that detects motion of the electronic device 604 in real space. For example, the electronic device 604 may include one or more accelerometers, gyrometers, magnetometers, optical sensors, or the like to detect motion.

The electronic device 604 may also include multiple localized secondary sensing regions, for example, such as secondary sensing region 648. The secondary sensing region 648 may detect a position of the electronic device 604 (or portion thereof). For example, in an embodiment where the electronic device 604 is a glove, the secondary sensing region 648 may detect a position of a finger and/or thumb relative to another point of the electronic device 604 (e.g., such as a position of the primary sensing region 644 and another of the multiple secondary sensing regions (not shown in FIG. 6A). In this regard, it will be appreciated that the secondary sensing region 648 depicted in FIG. 6A is shown for purposes of illustration and that the secondary sensing region 648 may be one of the multiple secondary sensing regions described herein.

The electronic device 604 may also identify an input configuration based on the relative position of any two portions of the flexible fabric 628. A portion of the flexible fabric 628 may be any identifiable subset or localized region of the flexible fabric 628, for example, such as a region of the flexible fabric 628 proximal to a palm, finger, thumb, and so on, when the electronic device 604 is a glove. For example, any two of the primary sensing regions 644 and the secondary sensing regions (such as secondary sensing region 648) may be associated with a first portion and a second portion of the flexible fabric 628, respectively. The electronic device 604 may be manipulated such that the first and second portions of the flexible fabric 628 are moveable relative to each other. In this manner, the foregoing sensing regions may operate in conjunction to detect movements and/or a position of the first and second portions, according to the embodiments described herein. In turn, the electronic device 604 may identify an input configuration based on the detected movement and/or position of the first and second portions.

In the embodiment of FIG. 6A, one or more of the primary sensing region 644 and/or the secondary sensing regions may be defined by the haptic structure 624. For example, the primary sensing region 644 and/or the secondary sensing regions may be a portion of the flexible fabric 628 where the haptic structure 624 is disposed. In other instances, the haptic structure 624 defines other sensing regions on the flexible fabric 628, including embodiments in which the haptic structure 624 is disposed over substantially all of the flexible fabric 628.

The haptic structure 624 may be coupled with the flexible fabric 628 such that deformations of the haptic structure 624 produce a haptic effect at a portion of the flexible fabric 628 positioned adjacent a user. In this regard, a processor of the electronic device 604 may be configured to deform the haptic structure 624 (e.g., via the generation of electrostatic force within the haptic structure 624, as described herein) such that corresponding portions of the flexible fabric 628 associated with a localized region, such as the primary sensing region 644 and secondary sensing regions similarly deform. This may allow the electronic device 604 to use the haptic structure 624 to create an immersive environment within which a user may interact with a computing device. For example, the electronic device 604 may produce various haptic effects throughout the flexible fabric 628 in response to a user altering a virtual environment depicted on a virtual reality or augmented reality device. The haptic structure 624 may be positioned within the flexible fabric 628 according to various different configurations to produce a desired haptic effect, for example, as described in greater detail below with respect to FIGS. 6B-6D.

Additionally or alternatively, the haptic structure 624 may measure a force input at the flexible fabric 628. For example, the haptic structure 624 may measure a force input at one or more localized regions, such as the primary sensing region 644 and/or the secondary sensing regions (such as secondary sensing region 648). As described herein (e.g., with respect to FIGS. 1A and 1B), a capacitance may be measured between electrodes of the haptic structure 624. A processing unit of the electronic device 604 may detect a change in capacitance between the electrodes as the electrodes move toward one another due to deformation of the haptic structure 624 caused by a force input. The change in capacitance may be correlated with a magnitude of the force input. Upon the change in capacitance exceeding a threshold value, the electronic device 604 may trigger a switch event. This may allow a user to deform the flexible fabric 628 to control a function of the electronic device 604. Moreover, because the user may deform the flexible fabric 628 in three-dimensional real space, a user may deform the flexible fabric 628 to manipulate or control a three-dimensional environment represented by a virtual or augmented realty device.

The electronic device 604 may also include various other components, such as one or more ports (e.g., charging port, data transfer port, or the like), communications components, additional input/output buttons, and so on. For example, the electronic device 604 may include communication module 652, which can be an antenna, a receptacle for a wired connection, and so on. Communication module 652 may be operatively coupled with a processing unit of the electronic device 604 and configured to transmit a user input signal. The communication module 652 may wirelessly transmit a user input signal to a computing device. The communication module 652 may also be configured to receive a dynamic feedback signal from a computing device that may be used by the electronic device 604 to generate haptic feedback. In this regard, the communication module 652 may be used to couple the electronic device 604 with a docking station.

Figure 6B:
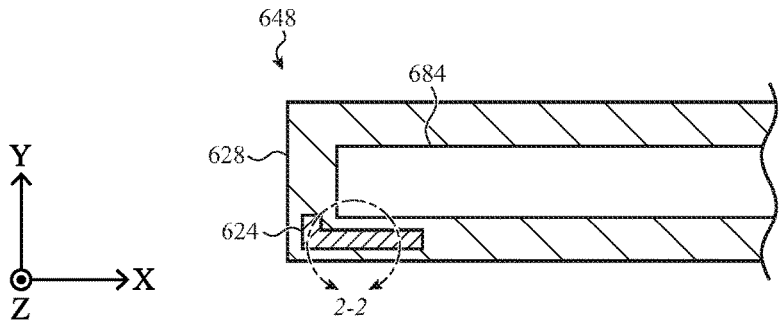
FIG. 6B depicts a cross-sectional view of the electronic device of FIG. 6A, taken along line E-E of FIG. 6A.

FIG. 6B depicts a cross-sectional view of the electronic device 604 of FIG. 6A, taken along line E-E of FIG. 6A. As illustrated in FIG. 6B, the secondary sensing region 648 includes the flexible fabric 628 and the haptic structure 624. The flexible fabric 628 may be positioned adjacent to a user 684 positioned along and/or within the flexible fabric 628. As shown in FIG. 6B, the haptic structure 624 may be positioned with (e.g., surrounded by) the flexible fabric 628. In other embodiments, the haptic structure 624 may be positioned at other locations at the flexible fabric 628, including an embodiment where the haptic structure 624 forms an input surface or interface that contacts the user.

As described above with respect to FIG. 6A, the haptic structure 624 may be coupled with the flexible fabric 628 such that deformations of the haptic structure 624 correspondingly deform the flexible fabric 628. This may produce various tactile sensations, which may be experienced by a user 684, including sensations associated with the deflection and/or expansion of the flexible fabric 628. More broadly, the haptic structure 624 may be configured to move the flexible fabric 628 along one or more of the y-direction, x-direction, and/or z-direction. Such movements of the flexible fabric 628 along the foregoing directions may be correlated, by a processor of the electronic device 604, with a virtual environment depicted in conjunction with a virtual or augmented reality device. For example, the flexible fabric 628 may move into a position corresponding to the texture of an object represented within the virtual environment when the user interacts with the object using the electronic device 604. This may allow the electronic device 604 to use the haptic structure 624 to simulate tactile sensations of the virtual environment.

Figure 6C:
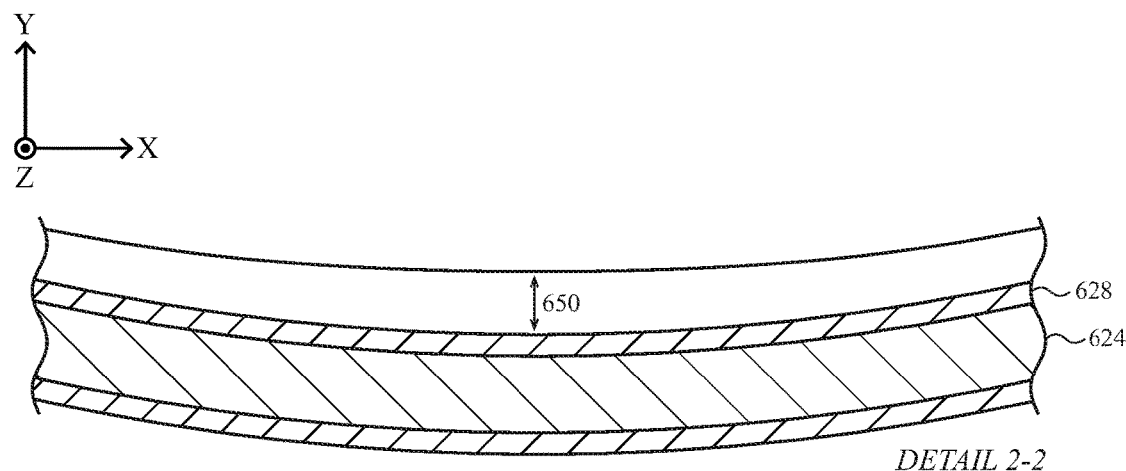
FIG. 6C depicts an enlarged view of the electronic device of FIG. 6B, taken at detail 2-2 of FIG. 6B.
Figure 6D:
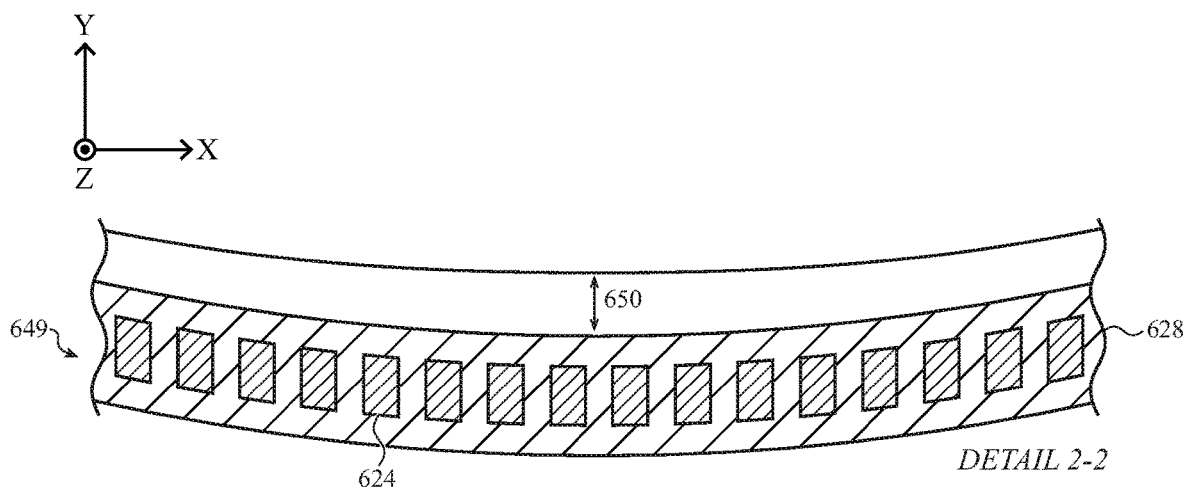
FIG. 6D depicts an enlarged view of the electronic device of FIG. 6B, taken at detail 2-2 of FIG. 6B, according to another embodiment.

FIGS. 6C and 6D depict detail 2-2 of FIG. 6B of the secondary sensing region 648. In particular, FIGS. 6C and 6D present detail 2-2 of alternate embodiments of the haptic feedback structure 624 at the secondary sensing region 648.

As illustrated in the embodiment of FIG. 6C, the secondary sensing region 648 is shown in a state in which the flexible fabric 628 is separated from the user 684 by an offset 650. The haptic structure 624 may be configured to deform, as described herein, in order to reduce the offset 650 such that the flexible fabric 628 contacts the user 684. This may allow the flexible fabric 628 to conform to a shape of the user 684. Conforming the flexible fabric 628 to a shape of the user 684 may enhance the tactile sensations experienced by the user, for example, because an increased surface area of the user 684 may contact the flexible fabric 628 and thus experience the associated tactile effects.

More broadly, the haptic structure 624 may be configured to alter the offset 650 to produce particular haptic effects. For example, the haptic structure 624 may be deformed in a manner such that the flexible fabric 628 encloses a volume of fluid (e.g., air) between the flexible fabric 628 and the user 684. The haptic structure 624 may be subsequently deformed to modify the offset 650, for example, by moving the flexible fabric 628 closer to, or further away from, the user 684. This may subsequently increase or decrease a pressure of the volume of fluid between the flexible fabric 628 and the user 684. The alterations of pressure may be correlated, by a processor of the electronic device 604, with a virtual environment depicted in conjunction with a virtual reality or augmented reality device. For example, the flexible fabric 628 may translate relative to the user 684 to produce a pressure sensation of an object represented within the virtual environment when the user interacts with the object using the electronic device 604.

To facilitate the foregoing, the haptic structure 624 may be positioned within the flexible fabric 628 such that the major surfaces of the electrodes of the haptic structure 624 are substantially parallel with a surface of the user 684. As such, a processing unit of the electronic device 604 may be configured to generate an electrostatic force that alters a cross-dimension of the haptic structure 624. In a particular embodiment, in response to the electrostatic force, a cross-dimension of the haptic structure 624 may be reduced along a direction substantially perpendicular with a surface of the user 684, while a cross-dimension of the haptic structure 624 may be enlarged along a direction substantially parallel with the surface of the user's finger 684.

As illustrated in the embodiment of FIG. 6D, the haptic structure 624 may be one of an array of haptic structures 649 positioned within the flexible fabric 628. The array of haptic structures 649 may be positioned within the flexible fabric 628 such that the major surfaces of electrodes of the array of haptic structures 628 are substantially transverse to the user 684. As such, a processing unit of the electronic device 604 may be configured to generate an electrostatic force that alters a cross-dimension of one or more of the array of haptic structures 649, such as the haptic structure 624. In a particular embodiment, in response to the electrostatic force, a cross-dimension of the haptic structure 624 may be enlarged along a direction substantially perpendicular with a surface of the user 684, while a cross-dimension of the haptic structure 624 may be reduced along a direction substantially parallel with the surface of the user 684.

Figure 7A:
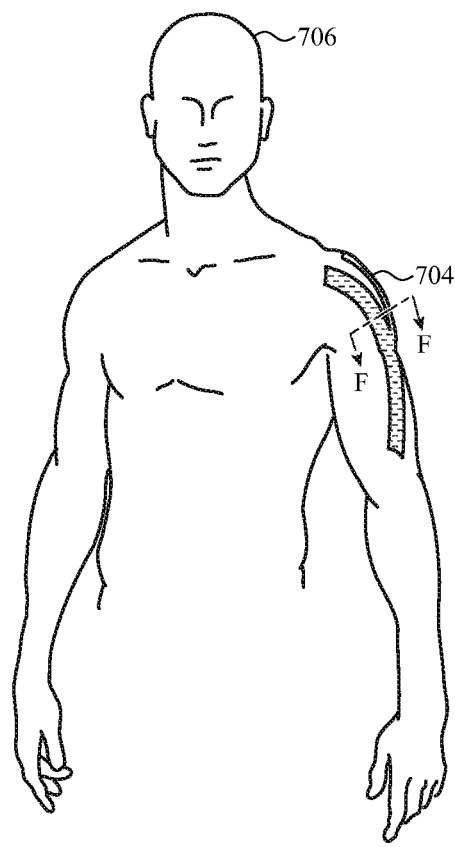
FIG. 7A depicts a sample interactive patch attached to a user.

FIG. 7A depicts an interactive patch 704 coupled with a user 706. The interactive patch 704 may be substantially analogous to the electronic device 604 described with respect to FIG. 6A. For example, the interactive patch 704 may include measurement circuitry to determine a position and/or input configuration of the interactive patch 704. The interactive patch 704 may also include a haptic structure configured to provide haptic feedback based on the identified input configuration of the interactive patch 704 and/or in response to an instruction from an associated computing device.

In a particular embodiment, the interactive patch 704 includes a haptic structure 724 (not shown in FIG. 7A), such as the haptic structures, deformable sheets, haptic layers, or the like discussed above and described in greater detail below. In this regard, the haptic structure 724 may be substantially analogous to the haptic structure 124 described with respect to FIG. 1B. As described with respect to FIGS. 7A and 7B, the haptic structure 724 may be used in a variety of manners within the interactive patch 704. For example, the haptic structure 724 may be configured to detect a force input and/or produce haptic feedback at an input surface of the interactive patch 704.

The haptic structure 724 may be coupled with a flexible fabric 728. The flexible fabric 728 may be sufficiently compliant such that it conforms to the shape of the user 706. The flexible fabric 728 may define an input surface of the interactive patch 704. The flexible fabric 728 may directly attach to the user 706. In this regard, the flexible fabric 728 may include an adhesive, strap, or other securement mechanism, that facilitates attachment of the interactive patch 704 to the user 706. The haptic structure 724 may be coupled with the user 706 such that deformations of the haptic structure 724 cause the flexible fabric 728 to correspondingly deform. As such, in some cases, the flexible fabric 728 may be configured to conform to a shape of the user 706 due to the haptic structure 724 being in a deformed or electrically actuated state. FIG. 7A depicts a non-limiting shape of the interactive patch 704 positioned on an arm of the user 706. It will be appreciated that other shapes of the interactive patch 704 are contemplated, including shapes configured for attachment to other portions of the user 706.

In a particular embodiment, the haptic structure 724 may be used to measure a physical characteristic or parameter of the user 706. As a non-limiting illustration, the interactive patch 704 may be coupled with a muscle of the user 706 such that movements of the user's muscle cause the haptic structure 724 to deform. As described herein, the deformations of the haptic structure 724 may be used to determine a magnitude and location of a force input. For example, a processing unit of the interactive patch 704 may be configured to detect a change in capacitance between electrodes of the haptic structure 724, and correlate the change in capacitance with a magnitude and location of a force input. This may allow the interactive patch 704 to be used in rehabilitation settings, in which muscle strain and associated characteristics may be tracked by the user 706 to facilitate injury recovery.

The interactive patch 704 may also be configured to provide haptic effects to the user 706. For example, a processing unit of the interactive patch 704 may be configured to produce an electrostatic force with the haptic structure 724 to cause the haptic structure 724 to deform. This deformation may correspondingly cause the flexible fabric 728 to deform, and thus produce a haptic sensation experienced by the user 706. The interactive patch 704 may produce haptic effects in response to one or more measured characteristics of the user 706. Continuing the non-limiting example of the rehabilitation setting, the interactive patch 704 may be configured to provide haptic effects in response to a muscle strain measured by the haptic structure 724. For example, the interactive patch 704 may deform or deflect (which may alter the stiffness of the interactive patch) in a manner that relieves the measured muscle strain and/or otherwise contributes to a rehabilitation process.

Figure 7B:
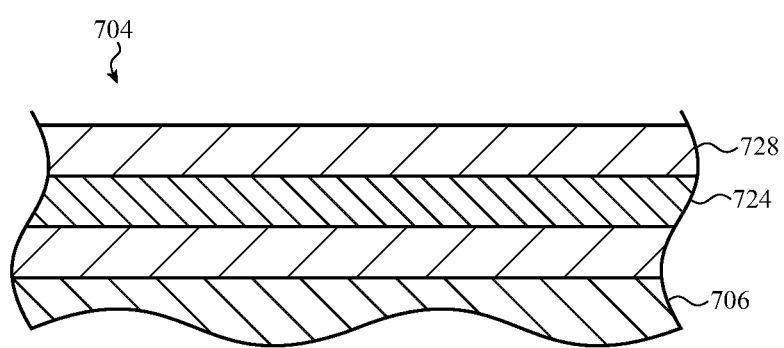
FIG. 7B depicts a cross-sectional view of the interactive patch of FIG. 7A, taken along line F-F of FIG. 7A.

FIG. 7B depicts cross-sectional views of the interactive patch 704 of FIG. 7A, taken along line F-F of FIG. 7A. As shown, the interactive patch 704 includes the flexible fabric 728 and the haptic structure 724. The flexible fabric 728 may be positioned on the user 706. The haptic structure 724 may be positioned within (e.g., encapsulated) the flexible fabric 728. In other cases, the haptic structure 724 may form an input surface of the interactive patch 704. For example, the interactive patch 704 may be attached directly to the user 706 at the haptic structure 724.

Figure 8:
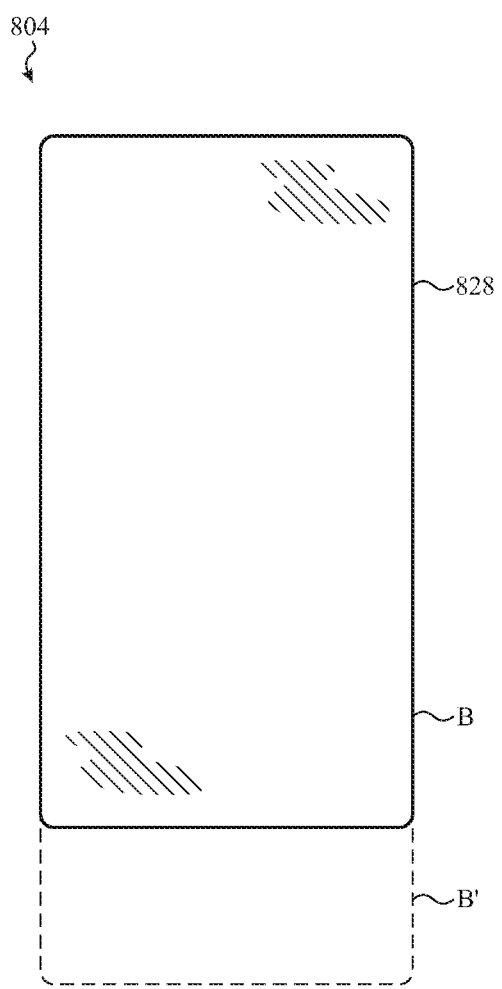
FIG. 8 depicts a sample interactive suit attached to a user.

FIG. 8 depicts an interactive fabric 804 that may be coupled with a user. The interactive fabric 804 may be substantially analogous to the interactive patch 704 described with respect to FIGS. 7A and 7B. For example, the interactive fabric 804 may include measurement circuitry to determine a position and/or an input configuration of the interactive fabric 804. The interactive fabric 804 may also include a haptic structure configured to provide haptic feedback based on the identified input configuration of the interactive fabric 804 and/or in response to an instruction from an associated computing device. In this regard, analogous to the components described above in relation to the embodiments of FIGS. 7A and 7B, the interactive fabric 804 may include a flexible fabric 828 and a haptic structure 824.

As described with respect to FIGS. 7A and 7B, the haptic structure 824 (not shown in FIG. 8) may be positioned within the flexible fabric 828. The haptic structure 824 may be coupled with the flexible fabric 828 such that the flexible fabric 828 may deform in response a deformation of the haptic structure 824. This may allow the haptic structure 824 to produce a haptic effect and/or detect one or more characteristics of a user.

The flexible fabric 828 may define a body suit or other clothing item that encompasses all, or a portion of, a user. The interactive fabric 804 may use the haptic structure 824 to modify a size and/or material characteristic of the flexible fabric 828. For example, the interactive fabric 804 may produce an electrostatic force within the haptic structure 824 that causes the haptic structure 824 to deform. The deformation of the haptic structure 824 may cause the flexible fabric 828 to transition between flexible fabric shape B and flexible shape B' (shown in phantom line). The flexible fabric shape B' may be a shape that conforms the flexible fabric 828 to a shape of a user, whereas the flexible fabric shape B may not conform to a shape of a user. Flexible fabric shape B' may be adjustable. For example, the interactive fabric 804 may control the electrostatic force generated with the haptic structure 824 to increase or decrease a size of the flexible fabric 828 such that it correctly conforms to a user. This may also allow the interactive suit to be adjustable to multiple different users.

The foregoing functionality may allow the interactive fabric 804 to dynamically adjust to an environment of a user. As a non-limiting illustration, one or more sensors coupled with the flexible fabric 828 may detect rapid acceleration of the interactive fabric 804 (e.g., which may be indicative of a user falling). In response to the detected rapid acceleration, the interactive suit 804 may deform the haptic structure 824 in a variety of manners to mitigate the impact of the fall. As one example, the interactive fabric 804 may increase a stiffness of selective portions of the flexible fabric 828, while expanding or loosening the flexible fabric 828 in other portions.

Figure 9:
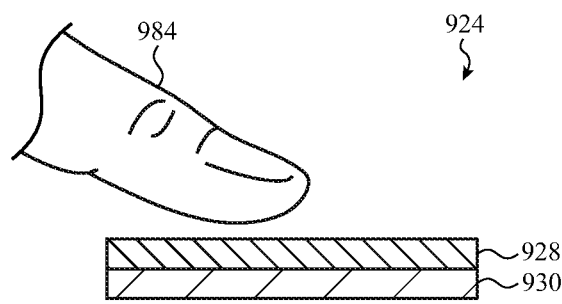
FIG. 9 depicts a haptic structure having an electroactive polymer and a strain-sensitive material.

FIG. 9 depicts a simplified cross-sectional view of a haptic structure 924. The haptic structure 924 may be substantially analogous to the haptic structures, deformable sheets, haptic layers, or the like described with respect to FIGS. 1B-1D (e.g., such as the haptic structure 124). For example, the haptic structure 924 may be configured to deform in response to an electrostatic force generated between electrodes of the haptic structure 924. This may allow the haptic structure 924 to produce a haptic effect, for example, at an input surface of an electronic device. The haptic structure 924 may also be used as a force sensor. In this regard, the haptic structure 924 may include an electroactive polymer (EAP) sheet 928. The EAP sheet 928 may be substantially analogous to the array of deformable capacitors 128 described with respect to FIGS. 1A-1D.

The haptic structure 924 may also include a strain-sensitive material 930. The strain-sensitive material 930 may be a piezoelectric element or the like that is configured to exhibit a change in an electrical property in response to a change in strain. The change in resistance may be correlated to, or used to estimate, an applied force exerted on the piezoelectric material. The strain-sensitive material 930 may also be configured to produce a haptic effect. For example, the strain-sensitive material 930 may include, or be defined by, a piezoelectric actuator or the like that is configured to deflect or deform in response to an electrical signal.

The EAP sheet 928 may be coupled to the strain-sensitive material 930. The EAP sheet 928 may be coupled with the strain-sensitive material 930 in a variety of manners, as described in greater detail below with respect to FIGS. 11A-11D. The EAP sheet 928 may cooperate with the strain-sensitive material 930 to produce a desired haptic effect. As explained in greater detail below with respect to FIGS. 10A and 10B, the EAP sheet 928 and the strain-sensitive material 930 each exhibit a distinct force-deflection characteristic when used individually. By combining the EAP sheet 928 and the strain-sensitive material 930, the haptic structure 924 may exhibit a force-deflection characteristic based on both of the respective force-deflection characteristics of the EAP sheet 928 and the strain-sensitive material 930.

It will be appreciated that the various haptic structures described above with respect to FIGS. 2A-8, may optionally include the strain-sensitive material 930 described with respect to FIGS. 9-11D. For example, the haptic structures described above with respect to FIGS. 2A-8 may include the strain-sensitive material 930 such that the various respective haptic structures exhibit a force-deflection characteristic that is distinct from a force-deflection characteristic of a haptic structure that does not include the strain-sensitive material 930.

Figure 10A:
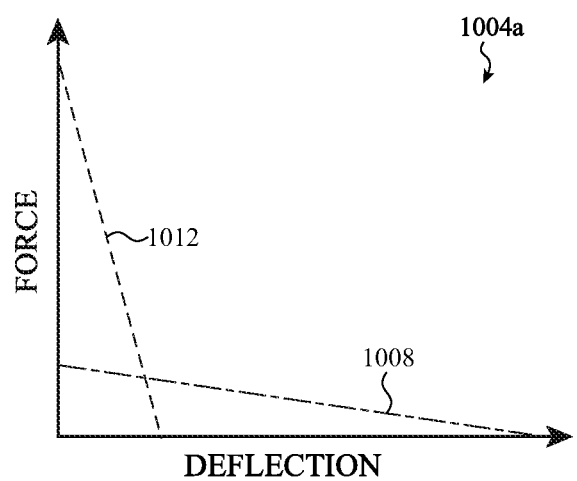
FIG. 10A depicts a force-deflection curve of the electroactive polymer and strain-sensitive material of FIG. 9, according to one embodiment.

FIG. 10A depicts a force-deflection diagram 1004*a*. The force-deflection diagram 1004*a* includes information corresponding to the displacement of an actuator (e.g., such as the EAP sheet 928 and/or the strain-sensitive material 930) at a corresponding value of blocking force under a predetermined or constant electrical charge or signal. The value of the blocking force corresponds to a magnitude of force generated by the actuator at a given deflection. Stated differently, the blocking force may be a force required to maintain a deflection or prevent the actuator from further deflecting at a given electrical charge. For example, at a maximum deflection (also known as the nominal displacement) the blocking force may be substantially zero; the actuator cannot deflect further at the constant electrical charge. Likewise, at a maximum blocking force, the displacement may be substantially zero; the actuator exerts a maximum amount of force as the actuator is biased by the contact electrical charge or signal to expand.

The EAP sheet 928 and the strain-sensitive material 930 may exhibit a force-deflection characteristic according to one or more curves depicted on force-deflection diagram 1004*a*. For example, the EAP sheet 928 may exhibit a force-deflection characteristic according to curve 1008. Further, the strain-sensitive material may exhibit a force-deflection characteristic according to curve 1012.

The curves 1008 and 1012 depict the force-deflection characteristic of the EAP sheet 928 and the strain-sensitive material 930, respectively, when operated individually. In this regard, as shown in FIG. 10A the curve 1008 may exhibit a relatively high degree of deflection for a correspondingly low degree of blocking force. As such, the EAP sheet 928 may be configured to have a high degree of deflection, but may exert a relatively low degree of blocking force. Similarly, the curve 1012 may exhibit a relatively low degree of deflection for a correspondingly high degree of blocking force. As such, the strain-sensitive material 930 may be configured to have a low degree of deflection, but may exert a relatively high degree of blocking force.

Figure 10B:
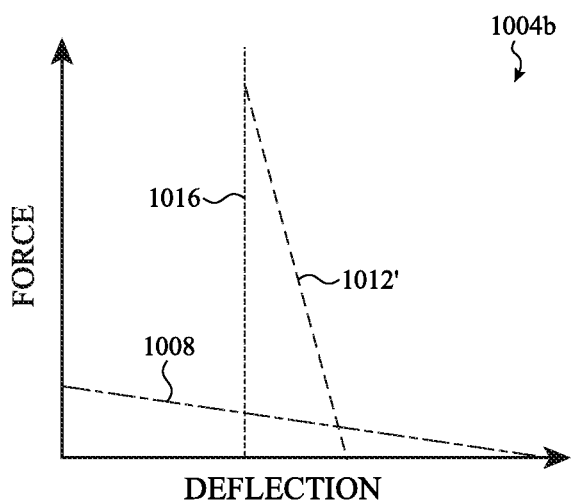
FIG. 10B depicts a force-deflection curve of the electroactive polymer and strain-sensitive material of FIG. 9, according to another embodiment.

FIG. 10B depicts force-deflection diagram 1004b. Analogous to the force deflection diagram 1004a, the force-deflection diagram 1004b includes information corresponding to the displacement of an actuator at a corresponding value of blocking force while exposed to a constant electrical charge or signal. Notwithstanding the foregoing, the force-deflection diagram 1004b depicts the force-deflection characteristic of components of the haptic structure 924, in which the EAP sheet 928 and the strain-sensitive material 930 are coupled together (e.g., as shown in FIG. 9). In particular, when coupled together within the haptic structure 924, the EAP sheet 928 may exhibit a force-deflection characteristic according to curve 1008 and the strain-sensitive material 930 may exhibit a force deflection characteristic according to curve 1012'.

As shown in FIG. 10B, coupling the EAP sheet 928 with the strain-sensitive material 930 shifts the force-characteristic of the strain-sensitive material 930 along the deflection axis. In particular, the EAP sheet 928 may be coupled with the strain-sensitive material 930 such that the EAP sheet 928 deflects by a predetermined amount prior to the strain-sensitive material 930 deflecting. In the embodiment depicted in FIG. 10B, the EAP sheet 928 may deflect between a substantially zero value and discontinuity 1016, prior to the strain-sensitive material 930 deflecting. For a deflection value greater than the discontinuity 1016, both of the EAP sheet 928 and the strain-sensitive material 930 may deflect within the haptic structure 924.

Such cooperation between the EAP sheet 928 and the strain-sensitive material may allow the haptic structure 924 to exhibit a force-deflection characteristic having a relatively high degree of deflection and exert a relatively high degree of blocking force. For example, as the haptic structure 924 deflects to a value that is greater than the discontinuity 1016, the blocking force exerted by the haptic structure 924 may be based on both the blocking force of the curve 1012' and the blocking force of the curve 1008. This may allow the haptic structure 924 to produce haptic effects having an increased magnitude for a corresponding deflection of the haptic structure 924.

FIGS. 11A-11D depict cross-sectional views of the haptic structure 924 of FIG. 9, according to alternate embodiments. For example, the haptic structure 924 may be formed from various arrangements and constructions of the EAP sheet 928 and the strain-sensitive material 930, as described herein below.

Figure 11A:
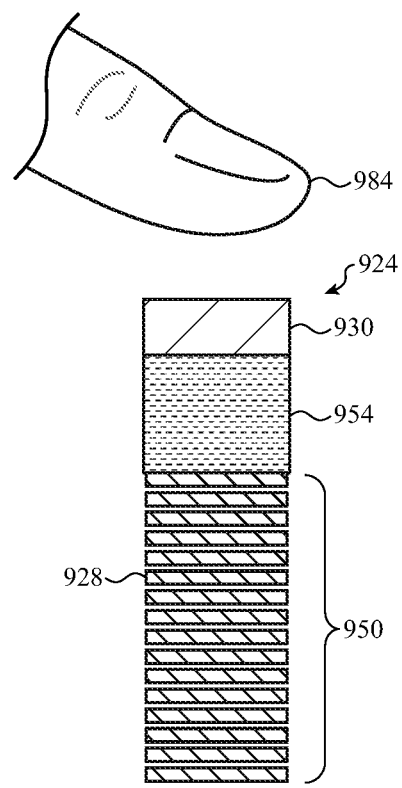
FIG. 11A depicts another embodiment of the haptic structure of FIG. 9.

As illustrated in the embodiment of FIG. 11A, the haptic structure 924 may include the strain-sensitive material 930, an array of EAP sheets 950, and an inertial mass 954. The EAP sheet 928 may be one of the array of EAP sheets 950. The inertial mass 954 may be positioned with the haptic structure 924 between the strain-sensitive material 930 and the array of EAP sheets 950. As shown in FIG. 11A, the strain-sensitive material 930 may be positioned within the haptic structure 924 proximal to a user 984.

The embodiment of FIG. 11A may be used to control or filter a frequency associated with the deflections of the haptic structure 924. For example, in a low frequency state, the array of EAP sheets 950 may be utilized by the haptic structure 924. In such instances, the strain-sensitive material 930 may be unactuated or unutilized by the haptic structure 924. Conversely, in a high frequency state, the strain-sensitive material 930 may be utilized by the haptic structure 924. In such instances, the array of EAP sheets 950 may be unactuated or unutilized by the haptic structure.

To facilitate the foregoing, the haptic structure 924 may include the inertial mass 954. The inertial mass 954 may separate the strain-sensitive material 930 and the array of EAP sheets 950 within the haptic structure 924. The inertial mass 954 may provide a counteracting or dampening force that corresponds to deflections of the array of EAP sheets 950 and/or the strain-sensitive material 930.

Figure 11B:
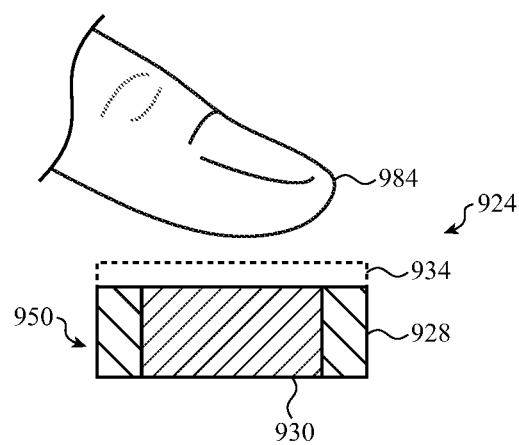
FIG. 11B depicts another embodiment of the haptic structure of FIG. 9.

As illustrated in the embodiment of FIG. 11B, the haptic structure 924 may include the array of EAP sheets 950 and the strain-sensitive material 930. In particular, one of the array of EAP sheets 950 may be positioned on a first side of the strain-sensitive material 930 and another of EAP sheets 950 may be positioned on a second side of the strain-sensitive material 930 opposite the first side. In some cases, the array of EAP sheets 950 may be configured to exert a compressive force on the strain-sensitive material 930. This may increase a stiffness or rigidity of the strain-sensitive material 930. It will be appreciated that additional strain-sensitive materials may be coupled with the array of EAP sheets 950, for example, to create an alternating grid or pattern of strain-sensitive materials 930 and EAP sheets 928.

In the embodiment of FIG. 11B, the array of EAP sheets 950 and strain-sensitive material 930 may cooperate to produce a desired haptic effect. As a non-limiting example, the array of EAP sheets 950 and the strain-sensitive material 930 may deflect or deform in a distinct manner to produce the desire haptic effect. To illustrate, a processing unit associated with the haptic structure 924 may generate an input signal configured to selectively deform one or both of the array of EAP sheets 950 and/or the strain-sensitive material 930. This may cause the array of EAP sheets 950 and the strain-sensitive material 930 to deform or deflect along distinct directions. For example, the input signal may be configured to alter a cross-dimension of the strain-sensitive material along a y-direction, while the input signal may alter a cross-dimension of the array of EAP sheets 950 along a z-direction and/or an x-direction. This may produce a haptic effect that causes a deflection acting normal or perpendicular to the user's finger 984 (e.g., as produced by the strain-sensitive material 930), and a deflection or shear force acting transverse to the user's finger 984 (e.g., as produced by the array of EAP sheets 950). In some cases, the strain-sensitive material 930 and the array of EAP sheets 950 may define a user input surface. In other cases, the haptic structure 924 may be coupled with a cosmetic cap 934 (shown in phantom line) positioned between the user's finger 984 and the array of EAP sheets 950 and the strain-sensitive material 930.

Figure 11C:
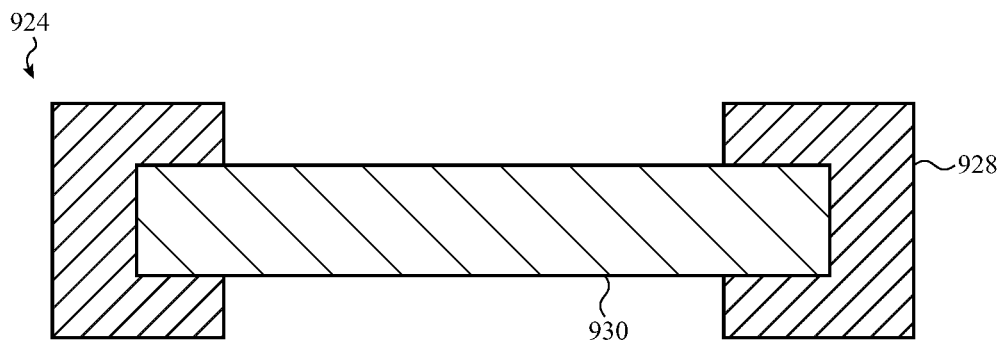
FIG. 11C depicts another embodiment of the haptic structure of FIG. 9.

As illustrated in the embodiment of FIG. 11C, the EAP sheet 928 may be selectively positioned on the strain-sensitive material 930 to define the haptic structure 924. In some cases, the EAP sheet 928 may be positioned on the strain-sensitive material 930 via an overmolding process. The overmolding process may selectively overmold the EAP sheet 928 to the strain-sensitive material 930. As shown in FIG. 11C, the EAP sheet 928 may be selectively overmolded at opposing end portions of the strain-sensitive material. In other cases, the electroactive polymer may be overmolded over substantially all of the strain-sensitive material 930 such that the EAP sheet 928 substantially encapsulates the strain-sensitive material 930.

Figure 11D:
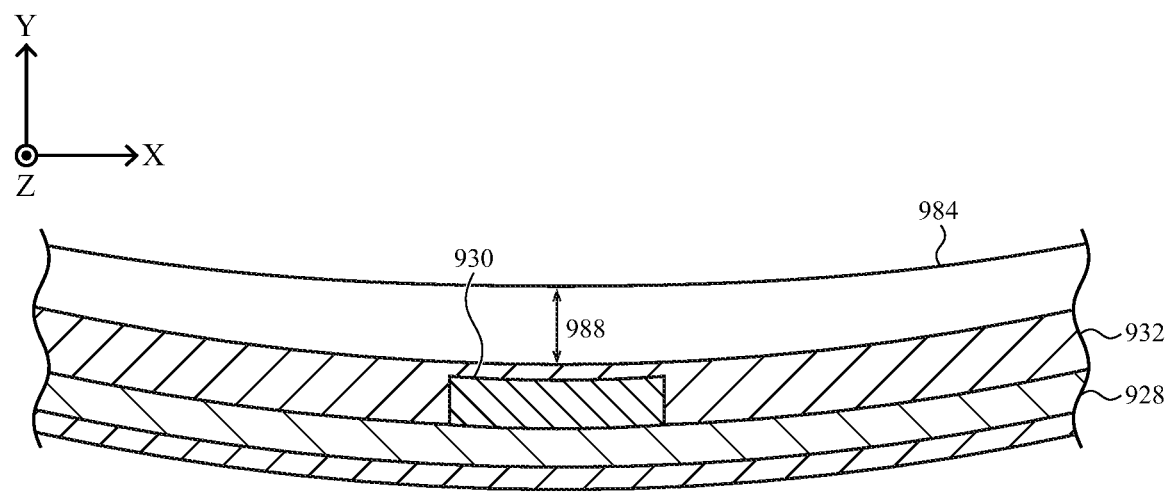
FIG. 11D depicts another embodiment of the haptic structure of FIG. 9.

As illustrated in the embodiment of FIG. 11D, the EAP sheet 928 and the strain-sensitive material 930 may be positioned within a flexible fabric 932. The flexible fabric 932 may be positioned adjacent to a user's finger 984. The flexible fabric 932 may be configured to deform such that the flexible fabric 932 conforms to a shape of the user 984. This may be substantially analogous to the flexible fabric 628 described with respect to FIGS. 6A-6D. In a particular embodiment, deformation of the flexible fabric 932 may reduce an offset 988 between the flexible fabric 932 and the user's finger 984.

In the embodiment of FIG. 11D, the EAP sheet 928 may be deformed in order to position the strain-sensitive material adjacent to the user's finger 984. For example, the EAP sheets 928 may be deformed such that the strain-sensitive material 930 (or corresponding interposed position of the flexible fabric 932) contacts the user's finger 984. This may allow a user to experience a tactile sensation produced by the strain-sensitive material 930. Additionally, the deformation of the EAP sheet 928 may cause the flexible fabric 932 to exert a force on the user's finger 984. Accordingly, this may alter a force-deflection characteristic of the strain-sensitive material 930 (e.g., as described with respect to FIGS. 10A and 10B), such that the flexible fabric 932 is configured to produce haptic effects having an increased magnitude.

Figure 12:
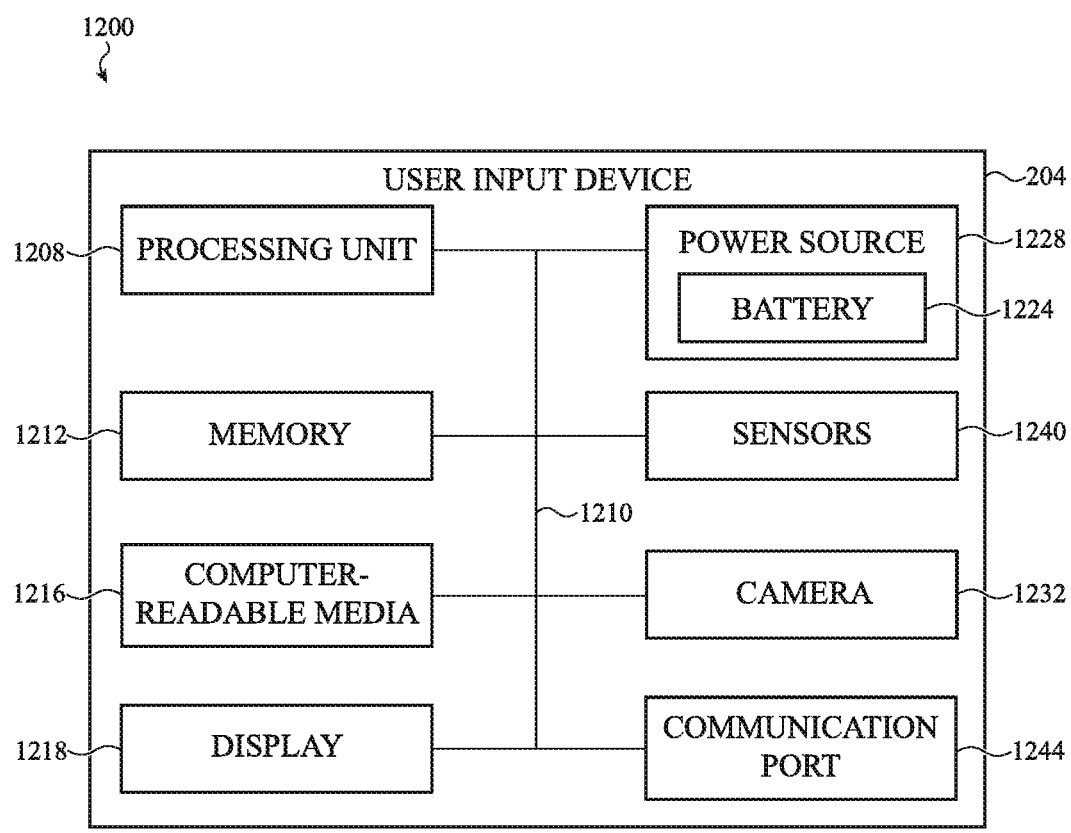
FIG. 12 illustrates a functional block diagram of a user input device.

FIG. 12 presents a functional block diagram 1200 of electronic device 204 described with respect to FIGS. 2A-2F. It will be appreciated, however, that the functional block diagram described herein of electronic device 204 may include components substantially analogous to components of other electronic devices or the like described herein. In this regard, the schematic representation in FIG. 12 may correspond to the electronic device 204 depicted in FIGS. 2A-2F, described above. However, the schematic representation in FIG. 12 may also correspond to the other electronic devices or the like described herein. The electronic device 204 may include any appropriate hardware (e.g., computing devices, data centers, switches), software (e.g., applications, system programs, engines), network components (e.g., communication paths, interfaces, routers) and the like (not necessarily shown in the interest of clarity) for use in facilitating any appropriate operations disclosed herein.

As shown in FIG. 12, the electronic device 204 may include a processing unit 1208 operatively connected to computer memory 1212 and computer-readable media 1216. The processing unit 1208 may be operatively connected to the memory 1212 and computer-readable media 1216 components via an electronic bus or bridge (e.g., such as system bus 1210). The processing unit 1208 may include one or more computer processors or microcontrollers that are configured to perform operations in response to computer-readable instructions. The processing unit 1208 may include the central processing unit (CPU) of the device. Additionally or alternatively, the processing unit 1208 may include other processors within the device including application specific integrated chips (ASIC) and other microcontroller devices.

The memory 1212 may include a variety of types of non-transitory computer-readable storage media, including, for example, read access memory (RAM), read-only memory (ROM), erasable programmable memory (e.g., EPROM and EEPROM), or flash memory. The memory 1212 is configured to store computer-readable instructions, sensor values, and other persistent software elements. Computer-readable media 1216 may also include a variety of types of non-transitory computer-readable storage media including, for example, a hard-drive storage device, a solid state storage device, a portable magnetic storage device, or other similar device. The computer-readable media 1216 may also be configured to store computer-readable instructions, sensor values, and other persistent software elements.

In this example, the processing unit 1208 is operable to read computer-readable instructions stored on the memory 1212 and/or computer-readable media 1216. The computer-readable instructions may adapt the processing unit 1208 to perform the operations or functions described above with respect to FIGS. 2A-2F. The computer-readable instructions may be provided as a computer-program product, software application, or the like.

As shown in FIG. 12, the electronic device 204 may also include a display 1218. The display 1218 may include a liquid-crystal display (LCD), organic light emitting diode (OLED) display, light emitting diode (LED) display, or the like. If the display 1218 is an LCD, the display may also include a backlight component that can be controlled to provide variable levels of display brightness. If the display 1218 is an OLED or LED type display, the brightness of the display 1218 may be controlled by modifying the electrical signals that are provided to display elements.

The electronic device 204 may also include a battery 1224 that is configured to provide electrical power to the components of the electronic device 204. The battery 1224 may include one or more power storage cells that are linked together to provide an internal supply of electrical power. In this regard, the battery 1224 may be a component of a power source 1228 (e.g., including a charging system or other circuitry that supplies electrical power to components of the electronic device 204). The battery 1224 may be operatively coupled to power management circuitry that is configured to provide appropriate voltage and power levels for individual components or groups of components within the electronic device 204. The battery 1224, via power management circuitry, may be configured to receive power from an external source, such as an AC power outlet or interconnected computing device. The battery 1224 may store received power so that the electronic device 204 may operate without connection to an external power source for an extended period of time, which may range from several hours to several days.

The electronic device 204 may also include one or more sensors 1240 that may be used to detect a touch and/or force input, environmental condition, orientation, position, or some other aspect of the electronic device 204. Example sensors 1240 that may be included in the electronic device 204 may include, without limitation, one or more accelerometers, gyrometers, inclinometers, goniometers, or magnetometers. The sensors 1240 may also include one or more proximity sensors, such as a magnetic hall-effect sensor, inductive sensor, capacitive sensor, continuity sensor, or the like.

The sensors 1240 may also be broadly defined to include wireless positioning devices including, without limitation, global positioning system (GPS) circuitry, Wi-Fi circuitry, cellular communication circuitry, and the like. The electronic device 204 may also include one or more optical sensors including, without limitation, photodetectors, photosensors, image sensors, infrared sensors, or the like. In one example, the sensor 1240 may be an image sensor that detects a degree to which an ambient image matches a stored image. As such, the sensor 1240 may be used to identify a user of the electronic device 204. The sensors 1240 may also include one or more acoustic elements, such as a microphone used alone or in combination with a speaker element. The sensors 1240 may also include a temperature sensor, barometer, pressure sensor, altimeter, moisture sensor or other similar environmental sensor. The sensors 1240 may also include a light sensor that detects an ambient light condition of the electronic device 204.

The sensor 1240, either alone or in combination, may generally be a motion sensor that is configured to determine an orientation, position, and/or movement of the electronic device 204. For example, the sensor 1240 may include one or more motion sensors including, for example, one or more accelerometers, gyrometers, magnetometers, optical sensors, or the like to detect motion. The sensors 1240 may also be configured to determine one or more environmental conditions, such as temperature, air pressure, humidity, and so on. The sensors 1240, either alone or in combination with other input, may be configured to estimate a property of a supporting surface including, without limitation, a material property, surface property, friction property, or the like.

The electronic device 204 may also include a camera 1232 that is configured to capture a digital image or other optical data. The camera 1232 may include a charge-coupled device, complementary metal oxide (CMOS) device, or other device configured to convert light into electrical signals. The camera 1232 may also include one or more light sources, such as a strobe, flash, or other light-emitting device. As discussed above, the camera 1232 may be generally categorized as a sensor for detecting optical conditions and/or objects in the proximity of the electronic device 204. However, the camera 1232 may also be used to create photorealistic images that may be stored in an electronic format, such as JPG, GIF, TIFF, PNG, raw image file, or other similar file types.

The electronic device 204 may also include a communication port 1244 that is configured to transmit and/or receive signals or electrical communication from an external or separate device. The communication port 1244 may be configured to couple to an external device via a cable, adaptor, or other type of electrical connector. In some embodiments, the communication port 1244 may be used to couple the electronic device 204 with a computing device and/or other appropriate accessories configured to send and/or receive electrical signals. The communication port 1244 may be configured to receive identifying information from an external accessory, which may be used to determine a mounting or support configuration. For example, the communication port 1244 may be used to determine that the electronic device 204 is coupled to a mounting accessory, such as a particular type of stand or support structure.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An input device comprising:
a housing comprising a glass substrate defining an exterior surface of the housing; and
a haptic structure positioned below and coupled to the glass substrate, the haptic structure comprising:
a compliant layer;
a first array of electrodes positioned along a first side of the compliant layer; and
a second array of electrodes positioned along a second side of the compliant layer opposite to the first side, wherein:
the compliant layer is a unitary sheet that separates the first array of electrodes and the second array of electrodes;
a first electrode of the first array of electrodes and a second electrode of the second array of electrodes define an electrode pair; and
in response to an input signal, the electrode pair is configured to compress a portion of the compliant layer and deform a region of the glass substrate thereby creating a local depression.

2. The input device of claim 1, wherein:
the electrode pair is configured to compress in response to a force applied to the glass substrate in the region above the electrode pair; and
a capacitance between the first electrode and the second electrode changes as the electrode pair compresses.

3. The input device of claim 1, further comprising a biasing element positioned below the glass substrate and configured to bias the region of the glass substrate in a direction that resists the local depression of the glass substrate.

4. The input device of claim 1, wherein:
the first array of electrodes is a first electrically conductive sheet;
the second array of electrodes is a second electrically conductive sheet; and
a major surface of each of the first electrically conductive sheet and the second electrically conductive sheet is substantially transverse to the exterior surface.

5. The input device of claim 1, wherein:
the housing defines a housing of a laptop; and
the glass substrate defines a surface of a trackpad.

6. The input device of claim 1, wherein:
the electrode pair is a first electrode pair;
the haptic structure additionally comprises a second electrode pair; and
the compliant layer is not compressed by the second electrode pair when the portion of the compliant layer is compressed by the first electrode pair.

7. The input device of claim 1, wherein:
the haptic structure is a first haptic structure;
the input device further comprises a second haptic structure; and
the first haptic structure and the second haptic structure form a layered haptic assembly.

8. An input device comprising:
a housing defining an opening;
a keycap positioned in the opening;
a first haptic structure coupled with the keycap and comprising:

a first compliant layer; and
a first array of electrodes and a second array of electrodes separated by the first compliant layer, wherein:
a first electrode of the first array of electrodes and a second electrode of the second array of electrodes define an electrode pair; and
a portion of the first compliant layer is compressed between the electrode pair; and
a second haptic structure positioned along a side of the keycap, the second haptic structure comprising:
a second compliant layer; and
a third array of electrodes and a fourth array of electrodes separated by the second compliant layer and configured to compress the second compliant layer in response to an electrical signal, wherein:
compressing the first compliant layer moves the keycap in a first direction; and
compressing the second compliant layer moves the keycap in a second direction that is different from the first direction.

9. A keyboard comprising:
a set of keycaps defining an input surface; and
a layered haptic assembly positioned below the set of keycaps and comprising:
a first haptic structure coupled to a keycap of the set of keycaps and comprising:
a first compliant layer;
a first set of electrodes; and
a second set of electrodes separated from the first set of electrodes by the first compliant layer; and
a second haptic structure coupled to the keycap and comprising:
a second compliant layer;
a third set of electrodes; and
a fourth set of electrodes separated from the third set of electrodes by the second compliant layer and configured to compress the second compliant layer in response to an electrical signal, wherein:
compressing the first compliant layer moves the keycap in a first direction; and
compressing the second compliant layer moves the keycap in a second direction that is different from the first direction.

10. The keyboard of claim 9, further comprising a keyboard housing surrounding the set of keycaps, wherein the input surface is flush with an exterior surface of the keyboard housing when a thickness of the first compliant layer is reduced.

11. The keyboard of claim 9, wherein:
the first haptic structure further comprises a first piezoelectric material positioned adjacent to the first compliant layer; and
the first set of electrodes and the first piezoelectric material cooperate to produce a haptic effect.

12. The keyboard of claim 9, wherein a compression of the first haptic structure lowers a height of the keycap.

13. The keyboard of claim 9, wherein an expansion of the first haptic structure raises a height of the keycap.

14. An electronic device comprising:
a housing comprising a glass component defining an input surface along an exterior surface of the electronic device;
a display positioned at least partially within the housing;
a haptic structure positioned below the display, the haptic structure comprising:
a compliant layer formed as a unitary sheet; and
a first array of electrodes and a second array of electrodes separated by the compliant layer; and
a processing unit configured to:
cause a first electrode of the first array of electrodes to become positively charged; and
cause a second electrode of the second array of electrodes to become negatively charged, thereby producing an attractive force between the first electrode and the second electrode that results in a compression of a portion of the compliant layer and a local deformation of the glass component to define a depressed region along the input surface.

15. The electronic device of claim 14, wherein:
a capacitance between the first array of electrodes and the second array of electrodes changes as the compliant layer compresses; and
the processing unit is configured to register an input in response to detecting the changing capacitance between the first array of electrodes and the second array of electrodes.

16. The electronic device of claim 14, wherein the electronic device is a mobile phone.

17. The electronic device of claim 14, wherein:
the electronic device is a watch; and
the watch further comprises a band attached to the housing, the band configured to couple the watch to a body of a user.

18. The electronic device of claim 14, wherein:
the haptic structure is a first haptic structure;
the electronic device further comprises a second haptic structure; and
the first haptic structure and the second haptic structure form a layered haptic assembly.

* * * * *